(12) United States Patent
Borran et al.

(10) Patent No.: US 7,394,865 B2
(45) Date of Patent: Jul. 1, 2008

(54) SIGNAL CONSTELLATIONS FOR MULTI-CARRIER SYSTEMS

(75) Inventors: Mohammad Jaber Borran, Irving, TX (US); Prabodh Varshney, Coppell, TX (US); Jorma Lilleberg, Oulu (FI)

(73) Assignee: Nokia Corporation, Espoo (FI)

( * ) Notice: Subject to any disclaimer, the term of this patent is extended or adjusted under 35 U.S.C. 154(b) by 646 days.

(21) Appl. No.: 10/607,406

(22) Filed: Jun. 25, 2003

(65) Prior Publication Data

US 2004/0264585 A1    Dec. 30, 2004

(51) Int. Cl.
*H04L 27/00* (2006.01)
(52) U.S. Cl. ................ 375/295; 375/261; 375/298
(58) Field of Classification Search ............. None
See application file for complete search history.

(56) References Cited

U.S. PATENT DOCUMENTS

| | | | | |
|---|---|---|---|---|
| 4,891,823 | A | 1/1990 | Cole | 375/242 |
| 5,267,021 | A | 11/1993 | Ramchandran et al. | 348/469 |
| 5,537,430 | A | 7/1996 | Park et al. | 714/792 |
| 5,822,371 | A * | 10/1998 | Goldstein et al. | 375/242 |
| 5,828,695 | A | 10/1998 | Webb | 375/219 |
| 6,081,555 | A * | 6/2000 | Olafsson | 375/242 |
| 6,097,764 | A | 8/2000 | McCallister et al. | 375/298 |
| 6,226,334 | B1 * | 5/2001 | Olafsson | 375/342 |
| 6,654,431 | B1 * | 11/2003 | Barton et al. | 375/346 |
| 7,016,296 | B2 * | 3/2006 | Hartman, Jr. | 370/204 |
| 2001/0031019 | A1 | 10/2001 | Jafarkhani et al. | 375/267 |
| 2002/0131515 | A1 | 9/2002 | Rodriguez | 375/262 |
| 2003/0043887 | A1 * | 3/2003 | Hudson | 375/144 |
| 2003/0076889 | A1 * | 4/2003 | Walker et al. | 375/261 |
| 2003/0123877 | A1 | 7/2003 | Lo | 398/34 |
| 2003/0126536 | A1 | 7/2003 | Gollamudi et al. | 714/748 |
| 2003/0210824 | A1 | 11/2003 | Falzon et al. | 382/240 |
| 2005/0094740 | A1 * | 5/2005 | Borran et al. | 375/267 |

FOREIGN PATENT DOCUMENTS

EP    1324558 A1 *    7/2003

OTHER PUBLICATIONS

Cover, et al., "Elements of Information Theory", Wiley Interscience, 1991, p. 231.

* cited by examiner

*Primary Examiner*—Jay K. Patel
*Assistant Examiner*—Curtis B. Odom
(74) *Attorney, Agent, or Firm*—Foley & Lardner LLP

(57) ABSTRACT

A signal constellation for wireline or wireless multi-carrier communication systems, such as systems using OFDM or MC-CDMA, has points separated from one another by maximizing a distance between conditional probability distributions, such as a Kullbeck-Leibler (KL) distance. Preferably, the constellation points are arranged in concentric circles, with or without a point at the origin, wherein adjacent circles are rotated to maximize an angular distance between points on adjacent circles. Pilot symbols inserted in the transmitted signal are used by a receiver to estimate the channel of the multi-carrier system. Different constellations show optimum performance for different signal to noise ratios, and for different numbers of taps used to estimate the channel, especially in a fast fading environment where there may be fewer pilots per OFDM or MC-CDMA symbol than channel taps.

16 Claims, 16 Drawing Sheets

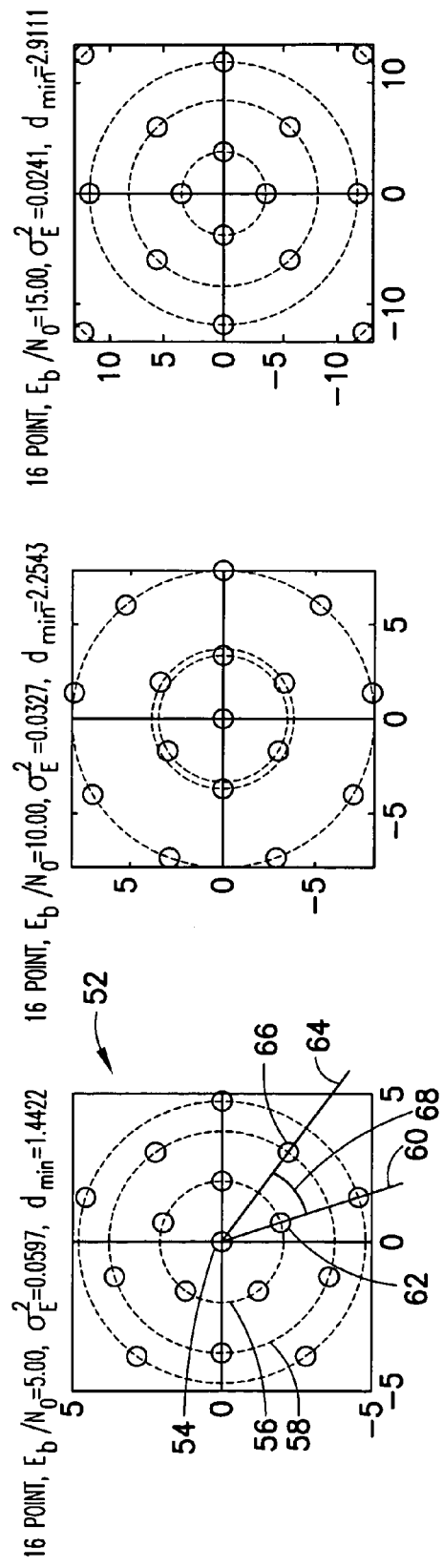
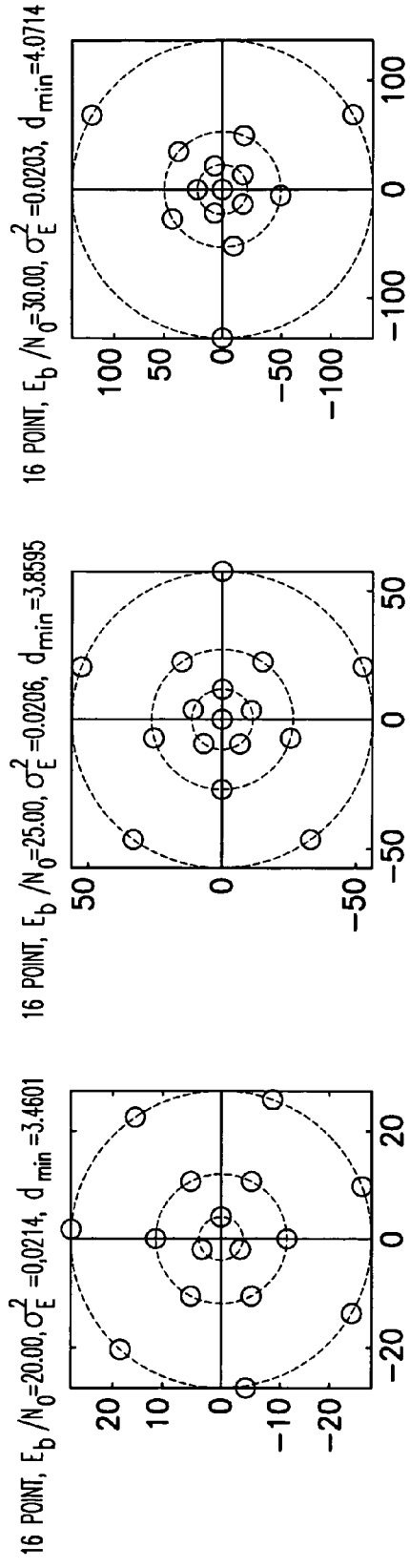

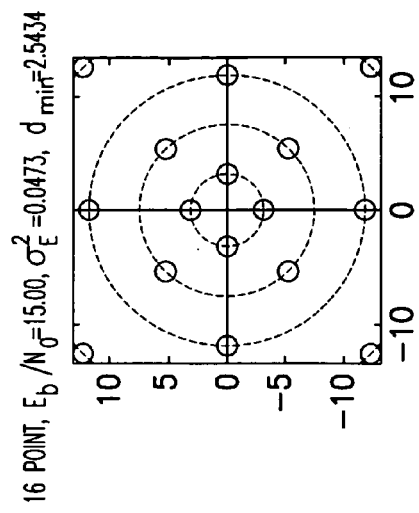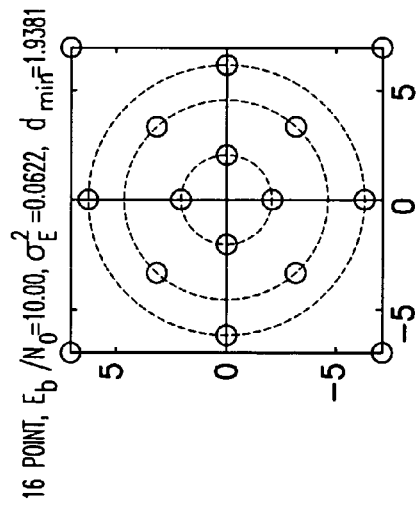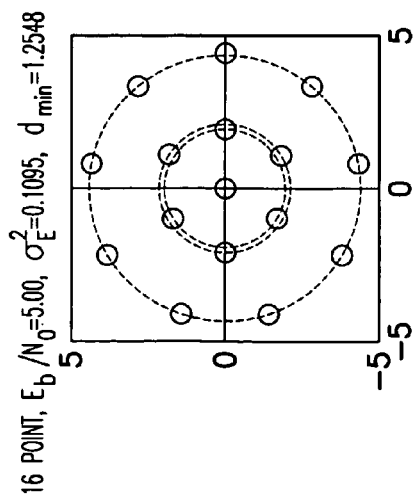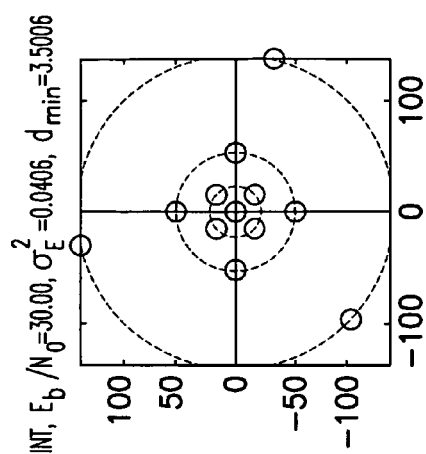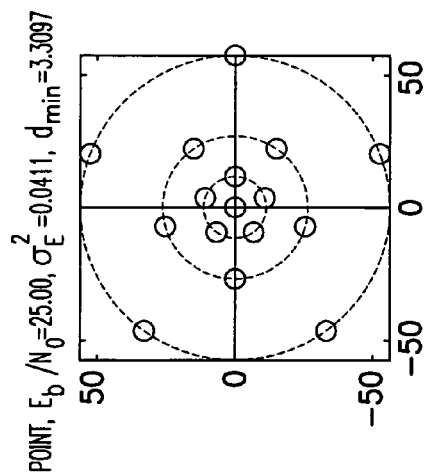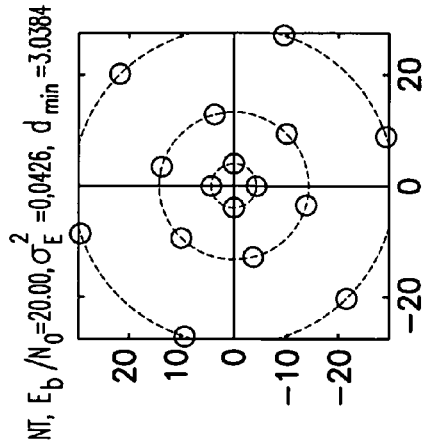

SIGNAL CONSTELLATIONS FOR MULTI-CARRIER SYSTEMS

FIELD OF THE INVENTION

The present invention relates generally to signal constellations for multi-carrier digital communications and criteria for designing such signal constellations. The present invention is particularly directed to signal constellations based on maximizing a minimum Kullback-Leibler distance between statistical distributions that maybe used in, but that are not necessarily limited to, fast fading environments and high SNR environments.

BACKGROUND

Frequency division multiplexing (FDM) is a technology that transmits multiple signals simultaneously over a single transmission path, such as a cable or wireless system. Each signal travels within its own unique frequency range (termed carrier, sub-carrier, or sub-channel), which is modulated by the data (text, voice, video, etc.). Each signal is a series of bits or symbols mapped from (in the case of a transmitted signal) or to (in the case of a received signal) signal constellation. A signal constellation may be represented graphically as a plurality of points spaced form one another on a two or three dimensional diagram, but the constellation itself is merely the assemblage of points spaced from one another in a particular manner.

An orthogonal FDM (OFDM) spread spectrum technique distributes the data over a large number of carriers that are spaced apart at defined frequencies. This spacing provides the "orthogonality" of the OFDM approach, and prevents the demodulators from seeing frequencies other than their own. The benefits of OFDM are high spectral efficiency, resiliency to RF interference, and lower multipath distortion. This is useful because in a typical terrestrial wireless communications implementation there are multipath channels (i.e., the transmitted signal arrives at the receiver using various paths of different length). Since multiple versions of the signal interfere with each other (inter-symbol interference (ISI), it becomes difficult to extract the original information. Discrete multi-tone modulation and multi-carrier CDMA (MC-CDMA) are other multi-carrier techniques. Multi-carrier modulation is stipulated in standards for digital audio and video broadcasting, wireless LANs, asymmetric DSL, and VDSL, to name a few of the wireless and wireline applications already in use.

OFDM has been successfully deployed in indoor wireless LAN and outdoor broadcasting applications. OFDM beneficially reduces the influence of ISI and has also been found to work well in multipath fading channels. These and other advantages render a multi-carrier transmission approach, and especially OFDM, a strong candidate for use in future mobile communication systems, such as one being referred to as 4G (fourth generation).

In a frequency selective fading channel each sub-carrier is attenuated individually. The resultant sub-channel frequency functions are frequency-variant and may also be time-variant, i.e. the channel magnitude maybe highly fluctuating across the sub-carriers and may vary from symbol to symbol. Under favorable conditions, significant amounts of data can be transmitted via the channel reliably. However, as the channel changes in time, the communication parameters also change. Under altered conditions, former data rates, coding techniques and data formats may no longer be possible. For example, when the channel performance is degraded, the transmitted data may experience excessive corruption yielding unacceptable communication parameters, such as excessive bit-error rates or packet error rates. The degradation of the channel can be due to a multitude of factors such as general noise in the channel, loss of line-of-sight path, excessive co-channel interference (CCI), interference from other cellular users within or near a particular cell, and multipath fading, in which the received amplitude and phase of a signal varies over time.

In wireless communications, channel state information (CSI) at the receiver is usually obtained through transmission of a number of known pilot or training symbols to offset channel degradation. Typically, an estimation algorithm at the receiver uses the pilot or training symbols to estimate the unknown channel based on the knowledge of the transmitted symbols. The estimation variance depends on the noise variance, number of the channel components to be estimated, and number of the pilot or training symbols (number of independent measurements). In general, the more the number of channel measurements, the lower the estimation variance will be. For a slowly fading channel where the fading coefficients remain approximately constant for many symbol intervals, the transmitter can send a large number of training or pilot symbols per channel realization without a significant loss in the data rate, and allow the receiver to accurately estimate the fading coefficients. In this case, a system designer can safely use a perfect CSI assumption to design optimal codes and constellations. Prior art signal constellations such as conventional phase shift keying (PSK) and quadrature amplitude modulation (QAM), which are based on maximizing the minimum Euclidean distance between constellation points, are premised on this assumption. In practice, due to the necessarily finite length of the training sequence, there will always be some errors in the channel estimates. However, prior art communication systems map symbols to signal constellations, such as QAM, that were derived assuming perfect knowledge of channel state at the receiver.

The assumption of perfect CSI at the receiver is especially inappropriate with multi-carrier communication systems. For fast fading channels where the fading coefficients vary too fast to allow a long training period, or for multi-path systems where very long training sequences are required to accurately train all of the possible channels from the transmitter to the receiver, obtaining an accurate estimate of the channel at the receiver may not always be possible.

In fast fading channels, the approach of sending a large number of training or pilot symbols is either infeasible due to the fast variations of the channel, or results in a significant loss in the actual data rate due to the fraction of the bandwidth spent on training. As a result, in high mobility environments, the number of measurements per channel realization is relatively small and the estimation quality is affected by one or both of the following effects:

The number of measurements per channel component is very small, resulting in a larger estimation variance due to the additive noise.

Some of the channel components are not estimated at all (e.g., the paths with small energy in a multipath environment). These components appear as additive terms in the estimation variance, which do not vanish at high SNR and result in an error floor in the performance curves.

In the presence of channel estimation errors due to the above effects, the constellations that are designed for the case of perfect CSI are no longer optimal. Using such prior art constellations often results in poor performances and high error floors, especially in fast fading environments and long delay spreads.

What is needed in the art is a new type of signal constellation that facilitates acceptable error rates over a fast-fading channel environment where only rough estimates of the channel may be available, especially for a multi-channel environment wherein the transmitter and/or receiver employ multiple antennas. Ideally, advancement in the art is best served by a technique for designing such a signal constellation to facilitate further refinements.

SUMMARY OF THE INVENTION

The present invention may be embodied in a communication unit for communicating over a wired or wireless multi-carrier system. In one aspect of the invention, the communication unit includes a storage medium for storing for a signal constellation, which may be in the form of a lookup table or an algorithm. The signal constellation is made up of a plurality of constellation points. The two closest points of the constellation define a minimum separation D from one another that is based on a maximized minimum difference between conditional probability distributions. Preferably, the separation D is a maximized minimum Kullbeck-Leibler distance.

The communications unit also includes at least one of a transmitter or a receiver. The transmitter includes a mapper for converting a signal to be transmitted, that is input into the mapper, to a plurality of symbols, each symbol corresponding to at least one of the constellation points. The transmitter also includes a pilot circuit for adding pilot symbols to the signal input to be transmitted, and a modulator for modulating the symbols in accordance with a multi-carrier transmission technique.

The receiver includes a channel estimator for estimating a channel of a multi-carrier system using pilot symbols of a received set of symbols, a demodulator for demodulating at least a portion of the received set of symbols in accordance with a multi-carrier transmission technique, and a de-mapper for converting the demodulated symbols to a plurality of data signals. The data signals, either each individually or groups of them, correspond to a constellation point. The receiver can use $N_p$ pilot symbols within a coherence interval to estimate $N_t$ taps of a multipath channel with a total of L taps, wherein the number $N_t$ is selected to minimize an estimation variance at a frequency bin defined by the multi-carrier modulating scheme. Where multi-carrier symbols are short, the receiver can use $N_p$ pilot symbols within a coherence interval that is less than the number of L channel taps.

Preferably, the points of the constellation are arranged in a plurality of concentric circles, and one point may lie at the origin of the circles. The circles are rotated relative to one another such that the minimum angular distance between a constellation point of one subset and a constellation point of another subset is maximized.

In another aspect of the present invention, since the signal constellations are optimized for different SNR values, the communications unit includes a storage medium for storing at least two signal constellations, and one or the other is used by the mapper/de-mapper depending upon whether or not a channel SNR is above or below a threshold value.

A mobile terminal for communicating over a fast fading, multi-carrier wireless channel is another aspect of the present invention. The mobile terminal includes a demodulator for demodulating a signal received from a multi-carrier wireless channel, a channel estimator for estimating the multi-carrier wireless channel using at least some pilot signals of the signal received, a signal constellation embodied on a computer storage medium, and computer code embodied on a computer storage medium for matching a symbol of the signal received to the signal constellation. The storage medium of the computer code may or may not be the same medium as that upon which the signal constellation is embodied. An equation stipulating a minimum separation distance between the nearest points of the signal constellation is given below in equation (24).

Preferably, the mobile terminal also includes a modulator for modulating a signal to be transmitted over the multi-carrier wireless channel, a pilot insertion block for adding pilots to the signal to be transmitted; and a second computer code embodied on a computer storage medium for matching the signal to be transmitted to the signal constellation.

Another aspect of the present invention is a method of transmitting a signal over a multi-carrier system. The method includes mapping a signal to be transmitted to a signal constellation, adding pilot symbols to the signal to be transmitted, and modulating the signal to be transmitted in accordance with a multi-carrier modulation technique. The signal constellation defines a plurality of constellation points such that a minimum separation between two constellation points is based on a maximized minimum difference between conditional probability distributions.

BRIEF DESCRIPTION OF THE DRAWINGS

FIGS. 6A–6F are constellation diagrams, each labeled with a different SNR to correspond to a column of Table 1, for a system wherein sixteen pilots are estimating eight taps of the Vehicular A channel sampled at 4,915,200 samples per second.

FIGS. 8A–8F are constellation diagrams, each labeled with a different SNR to correspond to a column of Table 2, for a system wherein eight pilots are estimating seven taps of the Vehicular A channel sampled at 4,915,200 samples per second.

DETAILED DESCRIPTION

This invention can be implemented in either the transmitter or the receiver, or in both, of a multi-carrier system, such as an OFDM system or a multi-carrier code division multiple access (MC-CDMA) system, using software, hardware, or a combination of software and hardware. The software is assumed to be embodied as a lookup table, an algorithm, or other program code that defines the points of a signal constellation and is accessed to map a signal to be transmitted to the signal constellation or map a received symbol from the signal constellation. The same signal constellation is resident at either one or both of the transmitter 22a and receiver 22b, though it need not be embodied in the same format (lookup table, algorithm, etc.).

Figure 1A:
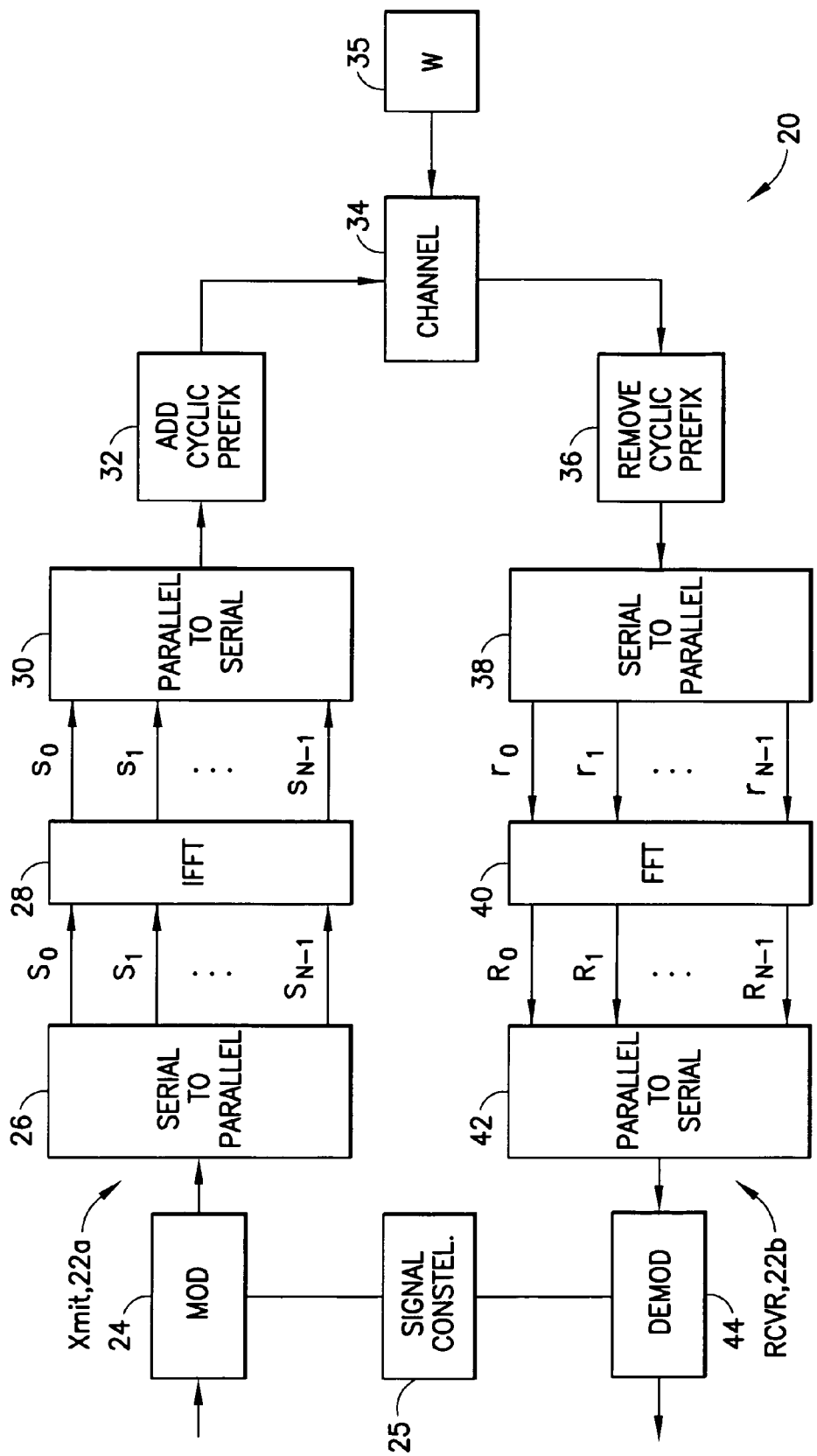
FIG. 1A is a high level block diagram of an N sub-carrier OFDM modem within the prior art.

A block diagram of a N sub-carrier OFDM modem 20, also referred to herein as a multi-carrier transceiver or a multi-carrier system, is shown in FIG. 1A as just one example of a multi-carrier modem that may use the present invention to advantage. At the transmitter 22a modulator 24 receives an incoming signal and accesses a storage medium 25 that stores a signal constellation to map the input signal to be transmitted to the symbols of the signal constellation. The signal may pass through a forward error controller (FEC) and/or a bit extractor (not shown) prior to entering the modulator 24, as known in the art. The modulator 24 then sends N complex symbols $S_n$, $0 \leq n \leq N-1$ that are multiplexed in a serial to parallel converter 26 to N sub-carriers. An Inverse Fast Fourier Transform (IFFT) block 28 translates the N frequency-domain symbols into N time-domain samples $s_n$, $0 \leq n \leq N-1$ that are applied to a parallel to serial converter 30, after which M cyclic prefix samples are inserted by block 32 before being transmitted over a time-varying dispersive channel 34 that is corrupted by noise 35, termed W in FIG. 1A. A multi-carrier symbol thus consists of N symbols in the frequency-domain, or N+M samples in the time-domain. At the receiver 22B, the cyclic prefix is stripped from the received time-domain samples in the block 36, and the output is applied to a serial to parallel converter 38 that outputs the remaining data samples $r_n$, $0 \leq n \leq N-1$. The separate received symbols are then input to a FFT block 40 to yield the received frequency-domain data symbols $R_n$, $0 \leq n \leq N-1$. The data symbols are then input to a parallel to serial converter 42, and the resulting symbol stream is then applied to a demodulator 44. The demodulator accesses the storage medium 25 and converts the demodulated symbol stream into a series of signals independent of the signal constellation. The signal output from the demodulator 44 may pass through a slicer/bit insertion block and FEC decoder (not shown) as known in the art. Mapping to and from the signal constellation may alternatively occur at other points along the system 10 without departing from the broader aspects of this invention.

Figure 1B:
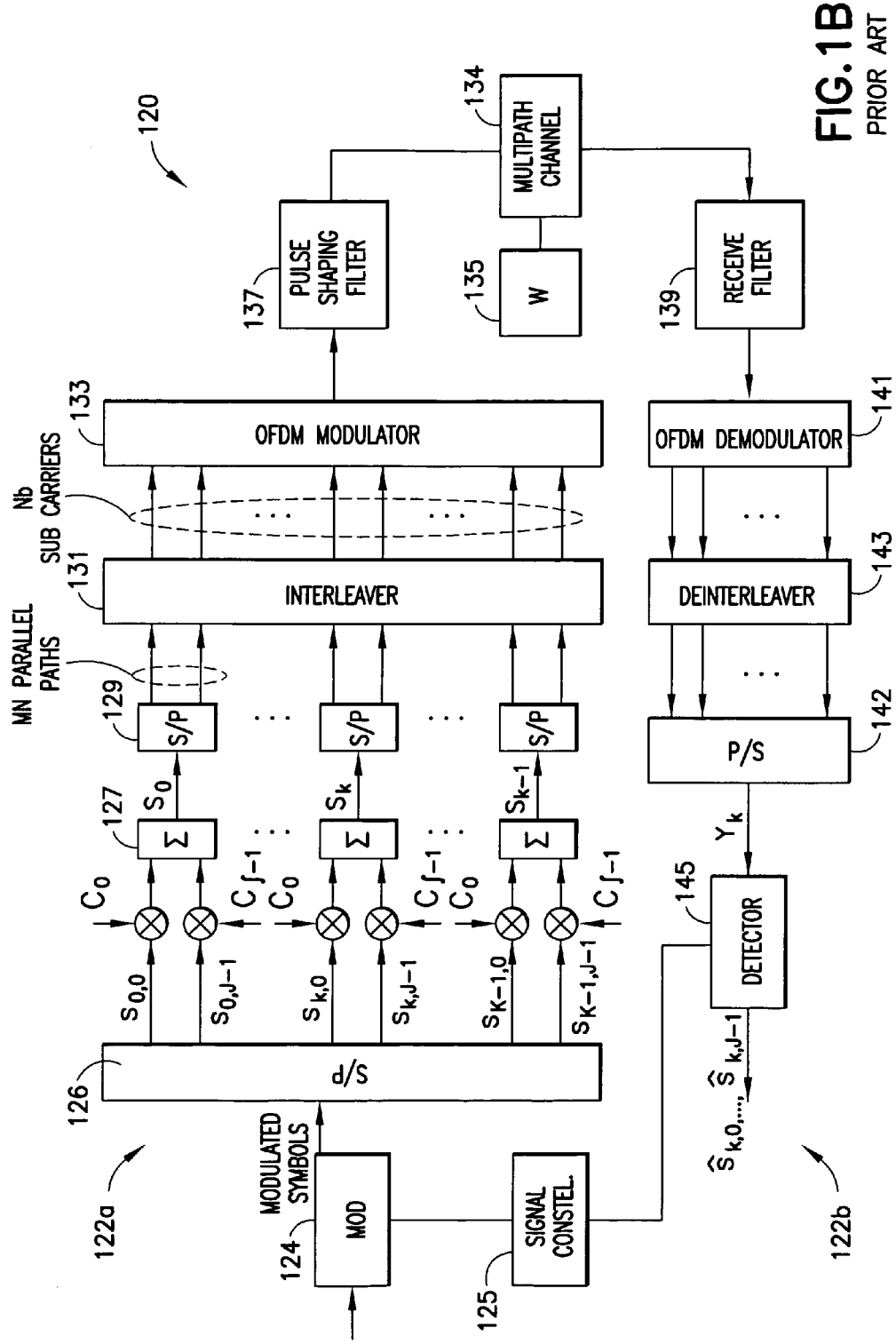
FIG. 1B is a high level block diagram of a $N_b$ sub-carrier MC-CDMA modem within the prior art.

FIG. 1B illustrates a high level logical block diagram of a MC-CDMA modem 120 according to the prior art that may employ the present invention. At a transmitter 122a, a signal to be transmitted, that represent multiple users, is input into a modulator 124, which accesses a storage medium 125 that stores a signal constellation to map the input signal to be transmitted to the symbols of the signal constellation. The modulated and mapped symbols then pass through a serial to parallel converter 126 where they are split into K blocks of J streams. The streams, $s_{0,0}, s_{0,j-1}, \ldots S_{k-1,j-1}$, are spread using Walsh-Hadamard codes $c_0, \ldots, c_{j-1}$ of length N, then summed at adders 127 to form a single spread stream $S_0, \ldots S_{k-1}$. The spread streams each then pass through a second serial to parallel converter 129, an interleaver 131 and an OFDM modulator (IFFT) 133 where they are divided into $N_b$ frequency bins. A cyclic prefix is preferably added at the OFDM modulator 133 to prevent inter-symbol interference (ISI) and inter-channel interference (ICI). This time domain signal then passes through a pulse-shaping filter 137 and transmitted over a channel 134, where noise W 135 is added.

At the MC_CDMA receiver 122b, a signal is first passed through a receive filter 139 that is preferably matched to the pulse shaping filter 137 to suppress out-of-band interference and noise. The filtered received signal then passes through an OFDM demodulator (FFT) 141 and then a de-interleaver 143, and a parallel to serial converter 142 that outputs spread streams approximating those output from the adders 127 in the transmitter 122a. A detector 145 accesses the storage medium 125 and generates hard or soft decision outputs for each original symbol or stream.

The present invention is directed in part to the signal constellation, and is thus not dependent upon the particular type of multi-carrier system used, whether OFDM, MC-CDMA, or others.

Figure 2:
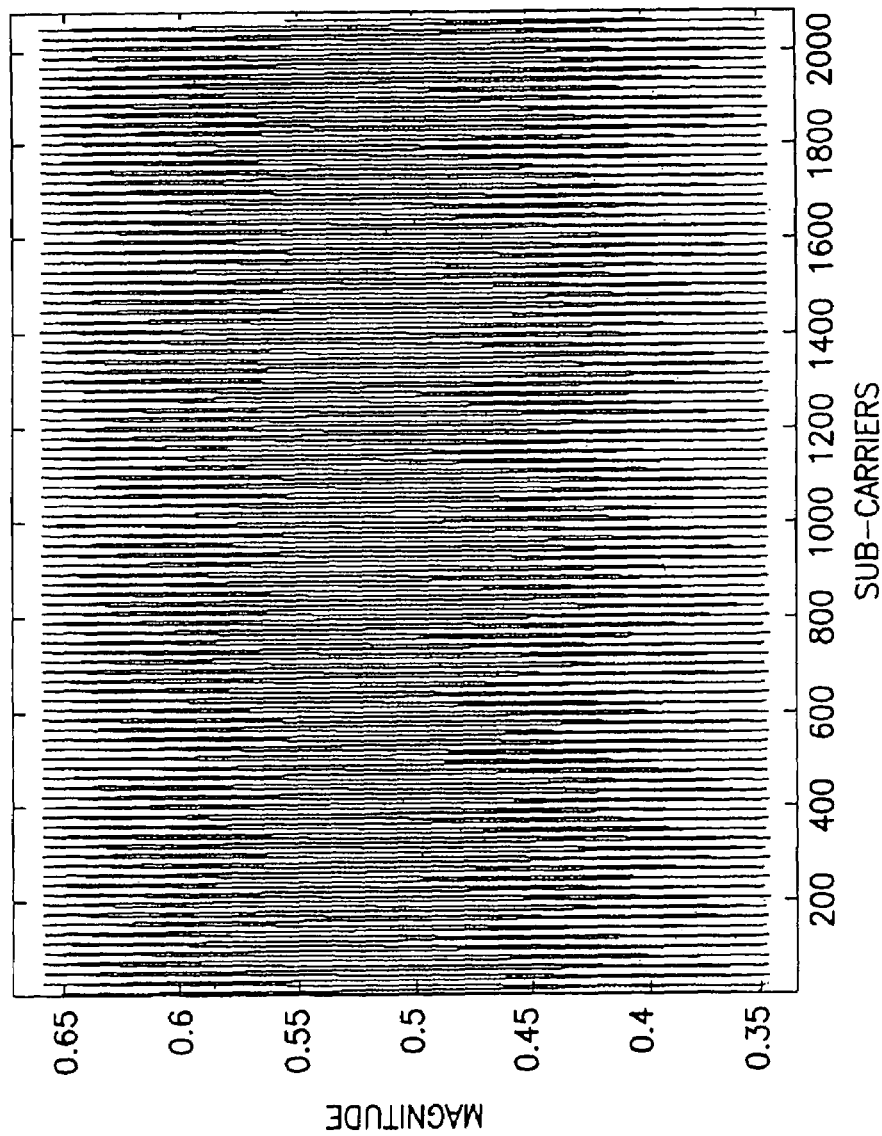
FIG. 2 is a snapshot diagram of a magnitude frequency function of a two-path Rayleigh fading channel.

To illustrate the sub-channels of a multi-carrier system and how they can vary from one to another, one may consider by example an OFDM modem with 2048 sub-carriers and a simple two-path Rayleigh fading channel with a 20 Hz Doppler. FIG. 2 shows a snapshot of the magnitude frequency function of the fading channel. It can be seen that the frequency function varies widely across the 2048 sub-channels.

The constellation design criterion used in this invention assumes that the channel is Rayleigh flat fading and the estimation error is Gaussian with zero mean and a known variance. Even though the channels considered herein are not flat-fading, because of the multi-carrier approach, the channel seen in each frequency bin can be approximately considered as a flat fading channel. Additionally, the fading process and the additive noise are both assumed to be Gaussian. As described below, this results in a Gaussian distribution for the estimation error.

Each of the sub-carriers of the channel 34 are bounded by an upper and a lower frequency limit, and the band therebetween is herein termed a frequency bin. A coherence interval is T symbol periods, wherein the assumption of flat fading and constant fading coefficients applies to a block of T consecutive symbol intervals, but the fading coefficients may change to new, independent coefficients at the start of each new block. Pilots are inserted uniformly in the frequency domain, and the channel estimation algorithm is maximum likelihood (ML) for the impulse response followed by a Fourier transform to obtain the channel frequency response. Assuming a Gaussian additive noise, this results in a least squares (LS) estimator. The following symbols are defined:

N: Number of the frequency bins, (FFT size in the case of no up-sampling)
L: Number of the channel taps (after sampling the delay profile at the sampling rate)
h: Channel impulse response (L×1 vector)
H: Channel frequency response (N×1 vector)
W: The first L columns of the N×N FFT matrix (N×L matrix)
X: Received signal in frequency domain (N×1 vector)
n: Received noise in frequency domain (N×1 vector) with i.i.d. elements from the distribution $N(0,\sigma^2)$
$N_p$: Number of equally spaced pilot symbols in frequency domain
$H_p$: Channel frequency response at pilot positions ($N_p$×1 vector)
$W_p$: Rows of W corresponding to the pilot positions ($N_p$×L matrix)
$X_p$: Received signal at pilot positions ($N_p$×1 vector)
$n_p$: Received noise at pilot positions ($N_p$×1 vector)
$N_t$: Number of estimated taps
$h_t$: Estimated taps of the channel ($N_t$×1 vector)
$h_r$: Unestimated taps of the channel ((L-$N_t$)×1 vector)
$W_t$: Columns of W corresponding to the estimated taps (N×$N_t$ matrix)
$W_r$: Columns of W corresponding to the unestimated taps (N×(L-$N_t$) matrix)
$W_{pt}$: Columns of $W_p$ corresponding to the estimated taps ($N_p$×$N_t$ matrix)
$W_{pr}$: Columns of $W_p$ corresponding to the unestimated taps ($N_p$×(L-$N_t$) matrix)

With the above notations, the channel frequency response H is given by:

$$H = Wh = W_t h_t + W_r h_r \quad (1.)$$

Assuming that pilot symbols are real valued and have unit power (i.e., are ones) yields:

$$X_p = H_p + n_p = W_p h + n_p = W_{pt} h_t + W_{pr} h_r + n_p \quad (2.)$$

The variance of channel estimation error, $\sigma_E^2$, is derived below for three separate instances: 1) the number of pilot symbols per coherence interval is equal to or greater than the number of channel taps and no up/down sampling at the transmitter/receiver; 2) the number of pilot symbols per coherence interval is less than the number of channel taps and no up/down sampling at the transmitter/receiver; and 3) up and/or down sampling at the transmitter/receiver using a pulse-shaping filter.

Case 1: $N_p \geq L$

In this case, the maximum likelihood (ML) estimate of the channel impulse response (at the estimated channel taps) is given by $$\hat{h}_t = (W_{pt}^H W_{pt})^{-1} W_{pt}^H X_p \quad (3.)$$

If pilots are equally spaced in the frequency domain, then $W_{pt}^H W_{pt} = N_p I_{N_t}$, where it is assumed that the fast Fourier transform (FFT) matrix is not normalized (i.e., each entry has a unit norm). Therefore, $$\hat{h}_t = \frac{1}{N_p} W_{pt}^H X_p \quad (4.)$$

Applying the Fourier transform to equation (4.) yields the estimated channel frequency response as $$\hat{H} = W_t \hat{h}_t = \frac{1}{N_p} W_t W_{pt}^H X_p \quad (5.)$$

Again, using the facts that pilots are inserted uniformly in the frequency domain, and $N_p \geq L$, then $$W_p^H W_p = N_p I_L \quad (6.)$$

and $$W_{pt}^H W_{pr} = 0_{N_t \times (L-N_t)} \quad (7.)$$

Substituting equations (6) and (7) into equation (5) yields $$\hat{H} = W_t h_t + \frac{1}{N_p} W_t W_{pt}^H n_p = H + \tilde{H} \quad (8.)$$

where $$\tilde{H} = -W_r h_r + \frac{1}{N_p} W_t W_{pt}^H n_p \quad (9.)$$

is the estimation error. Without loss of generality, the estimated taps of the channel are assumed to be the first $N_t$ taps. Assuming also that the channel taps are independent complex Gaussian random variables with zero mean and variance $P_l$ for the $l^{th}$ tap, and are independent from the additive noise, the covariance matrix of the estimation error is then $$cov(\tilde{H}) = W_r \begin{bmatrix} P_{N_t} & & 0 \\ & \ddots & \\ 0 & & P_{L-1} \end{bmatrix} W_r^H + \frac{\sigma^2}{N_p} W_t W_t^H \quad (10.)$$

Since each element of W has unit norm, the estimation variance at each frequency bin is given by $$\sigma_E^2 = \sum_{l=N_t}^{L-1} P_l + \frac{\sigma^2 N_t}{N_p} \quad (11.)$$

Equation (11.) reveals that the estimation variance consists of two terms. The first term is due to the unestimated taps of the channel, and the second term is due to the additive noise. If $N_t \geq L$, the first term vanishes, and the estimation variance increases linearly with the noise variance and number of estimated taps, and decreases linearly with the number of pilots. In this case, the optimum value for the number of the estimated taps is L. If $N_t < L$, there is a trade off; increasing $N_t$ decreases the first term but increases the second term. The optimal value for $N_t$ in this case depends on the noise variance and also the delay profile of the channel (the $P_l$ values). At high SNR (small values of $\sigma^2$), the second term is very small, and the estimation variance is dominated by the contributions from the unestimated taps. Therefore, it is advantageous to estimate all of the channel taps. However, at low SNR, it might be possible to obtain a smaller variance by estimating fewer taps. Regardless, for a fixed $N_t$, estimating stronger taps will result in a smaller variance. It is also obvious from equation (11.) that if all of the channel taps are estimated, the estimation variance goes to zero as SNR approaches infinity.

Figure 3A:
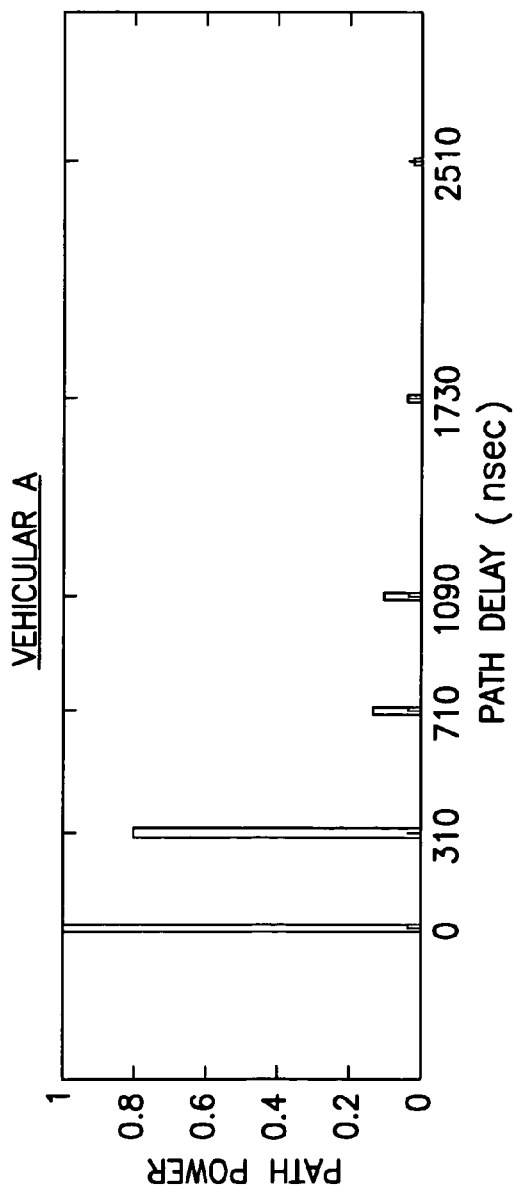
FIG. 3A is a graph showing a six-path delay spread and channel energy for an ITU Vehicular A channel.
Figure 3B:
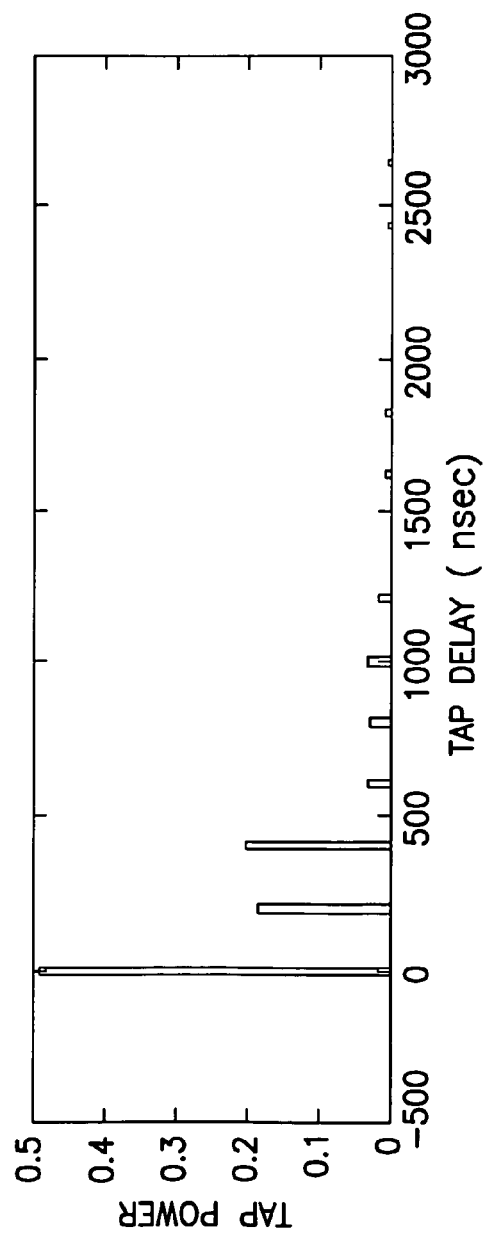
FIG. 3B is a graph showing a fourteen-tap channel and tap energy after sampling the six-path channel of FIG. 3A.

As an example, consider an ITU Vehicular A channel, sampled at 4,915,200 samples per second (four times the chip rate of 1xEV-DV standard). FIG. 3A shows the original delay profile for this channel, and FIG. 3B shows the sampled delay profile for the same channel. The original 6-path channel (FIG. 3A) becomes a 14-tap channel (FIG. 3B) after this sampling. Even though more than 96% of the channel energy is in its first 6 taps, and approximately 98% of the channel energy is in the first 7 taps, it is demonstrated below that even the small (2–4% percent) estimation errors due to not estimating the taps beyond the $6^{th}$ or $7^{th}$ tap can result in a significant performance degradation, and error floors as high as 1% raw symbol error.

Figure 4A:
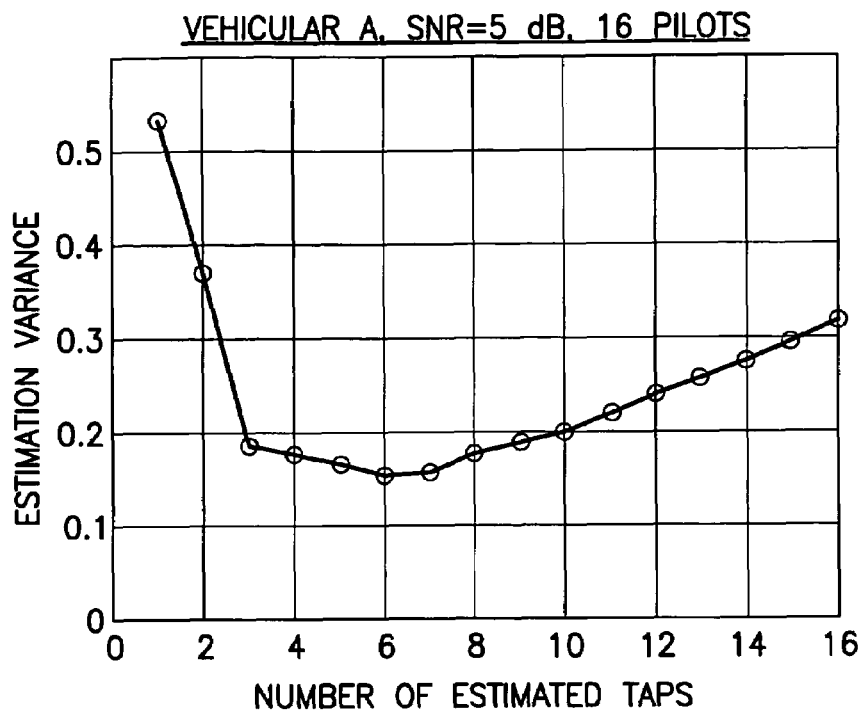
FIG. 4A is a graph showing estimated variance for various numbers of estimated channel taps at 5 dB SNR for sixteen pilots inserted in an OFDM symbol on an ITU Vehicular A channel.
Figure 4B:
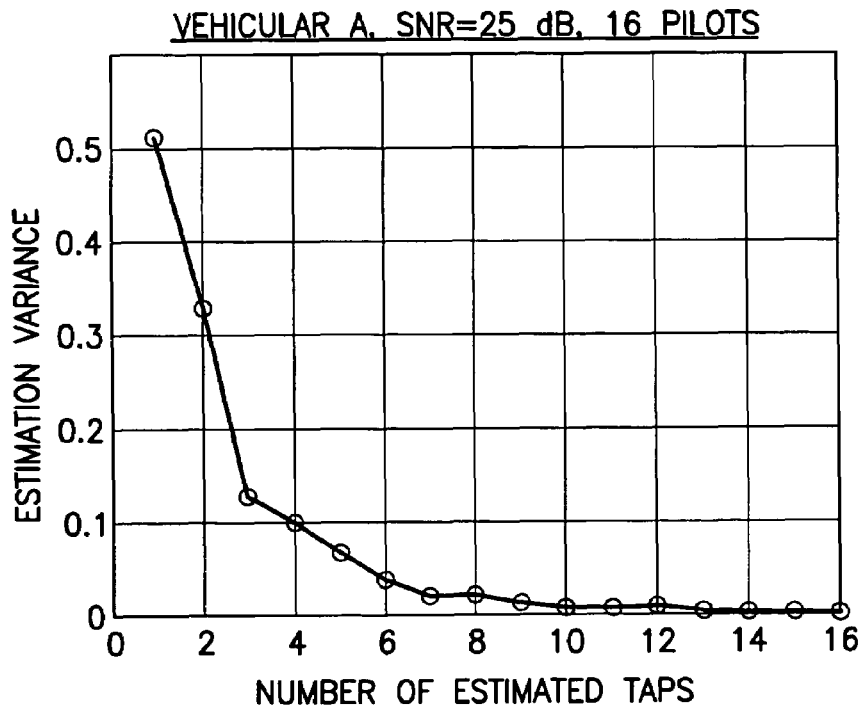
FIG. 4B is a graph similar to FIG. 4A, but for 25 dB SNR.

FIGS. 4A–4B show the estimation variance for a multi-carrier system in the above channel, at SNR=5 dB for FIG. 4A and at SNR=25 dB for FIG. 4B. In both instances, 16 pilots are uniformly inserted in the orthogonal frequency division multiplexed (OFDM) symbol. It has been assumed that the OFDM symbol length and the mobile speed are such that the channel remains approximately constant during one OFDM symbol. For the 5 dB SNR depicted in FIG. 4A, the optimum number of estimated taps is 6, whereas for the SNR of 25 dB depicted in FIG. 4B, the optimum number is 14, which is the total number of channel taps. (Respecting FIG. 4B, the numeric values for the estimation variances at 14, 15, and 16 estimated taps are $2.8 \times 10^{-3}$, $3.0 \times 10^{-3}$, and $3.2 \times 10^{-3}$, respectively, confirming an increase in variance beyond the $14^{th}$ tap that may not be evident by FIG. 4B alone).

Case 2: $N_p < L$

At high mobility scenarios (large Doppler spreads), it is advantageous to transmit shorter OFDM symbols (i.e., use wider sub-carriers) so that the fading coefficients remain nearly constant during one OFDM symbol (the relative Doppler is small and negligible). Using short OFDM symbols implies using a smaller number of pilots per channel realization. Considering higher mobile speeds, or for a wideband system, it is reasonable that the coherence interval will be reduced so that the number of pilots is less than the actual number of channel taps. Since, in order to have a meaningful estimation, the number of measurements has to be at least equal to the number of variables that we would like to estimate, the maximum value for $N_t$ in this case is $N_p$, and it is not possible to estimate all of the channel taps. As detailed below, the residual unestimated taps in this case result in an unavoidable error floor in the performance curves.

The assumption that $N_p < L$ results in a wide $W_p$ matrix (more columns than rows). As a result, equations (6.) and (7) as applied to the first case above are not valid for this second case. Equation (7) instead is replaced by:

$$W_{pt}^H W_{pr} = [0_{N_p \times (N_p - N_t)} f(N_p) I_{N_t} 0_{N_p \times (N_p - N_t)} f(2N_p) I_{N_t} 0_{N_p \times (N_p - N_t)}, \cdots ]_{N_p \times (L - N_t)}$$ (12.)

where $$f(n) = N_p \exp\left(-j \frac{2\pi}{N} p_0 n\right)$$ (13.)

and $p_0$ is the index of the first pilot in the OFDM symbol.

Also instead of equation (9.), the following expression yields the estimation error for the second case:

$$\tilde{H} = \left(\frac{1}{N_p} W_t W_{pt}^H W_{pr} - W_r\right) h_r + \frac{1}{N_p} W_t W_{pt}^H n_p$$ (14.)

With the previous assumptions on the distributions of the channel coefficients and the additive noise, this estimation error is a zero-mean Gaussian vector. In this second case, the estimation variance is not the same for different frequency bins as it was for the first case. Therefore, the average estimation variance, averaged over all frequency bins, is a more accurate representation for the second case. The average estimation variance over all frequency bins is:

$$\bar{\sigma}_E^2 = \sum_{\substack{l=N_t \\ mod(l, N_p) < N_t}}^{L-1} 2P_l + \sum_{\substack{l=N_t \\ mod(l, N_p) \geq N_t}}^{L-1} P_l + \frac{\sigma^2 N_t}{N_p}$$ (15.)

Equation 15 reveals that, for the second case, the estimation variance consists of three terms. The first two terms are due to the unestimated taps, whereas the third term is due to the additive noise. Equation 15 is similar to equation (11.), as detailed below, with the difference that some of the unestimated taps contribute twice to the estimation variance. This is because in this second case, unlike the first case, the projection of unestimated dimensions over estimated dimensions is not necessarily zero. Therefore, values from some of the unestimated dimensions erroneously appear in the estimated dimensions, which makes their contribution to the estimation error a two-fold contribution (once because they are not estimated, and a second time, because they add to the error in an estimated tap).

Similar to the first case, the optimum number of estimated taps depends on the noise variance as well as the delay profile of the channel (the $P_l$ values). However, unlike the first case, the estimation variance in this second case cannot be made arbitrarily small by increasing the signal to noise ratio. At high SNR, the third term of equation (15) becomes very small. The second term can also be made zero by letting $N_t = N_p$. However the first term will always be there. The minimum achievable estimation variance in this second case is given by the following expression:

$$\bar{\sigma}_{E, min}^2 = \sum_{l=N_p}^{L-1} 2P_l$$ (16.)

Figure 5A:
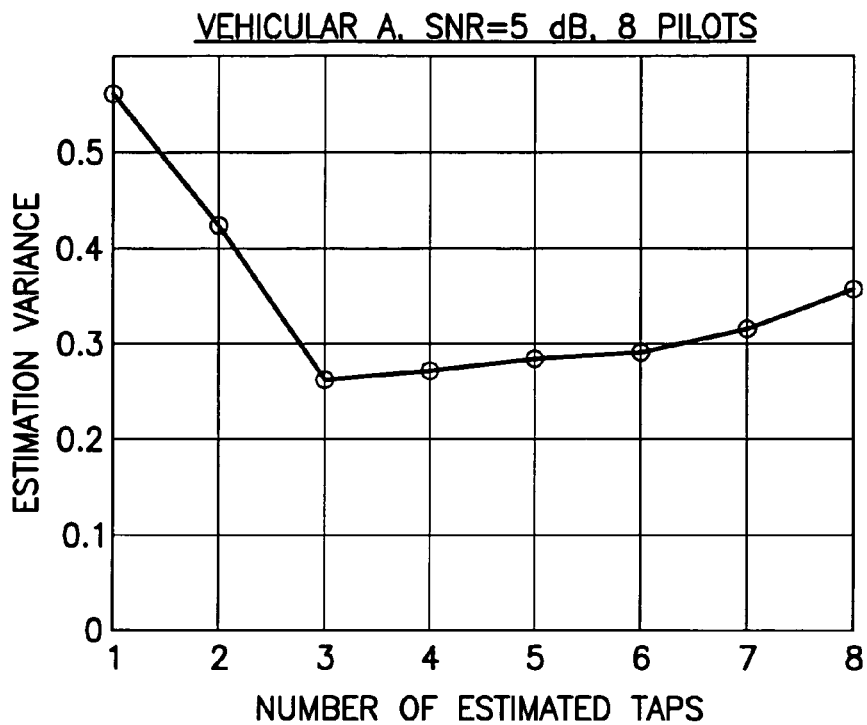
FIG. 5A is a graph similar to FIG. 4A, but for eight pilots.
Figure 5B:
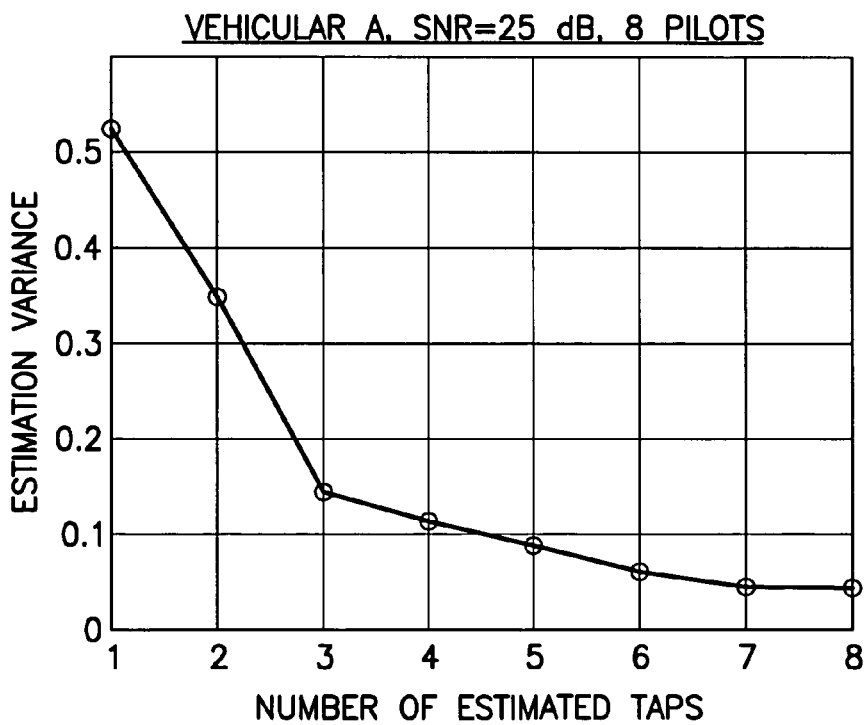
FIG. 5B is a graph similar to FIG. 4A, but for eight pilots and 25 dB SNR.

FIGS. 5A–5B show the estimation variance for a multi-carrier system in the Vehicular A channel of FIGS. 3A–3B at two different SNR values of 5 dB (FIG. 5A) and 25 dB (FIG. 5B). In both instances, 8 pilots are uniformly inserted in the OFDM symbol. It has been assumed that the OFDM symbol length and the mobile speed are such that the channel remains approximately constant during one OFDM symbol. At 5 dB SNR (FIG. 5A), the optimum number of estimated taps is 3, whereas at SNR of 25 dB, the optimum number is 8, which is the total number of pilots. At 25 dB (FIG. 5B), even though the SNR is relatively high, the minimum estimation variance is around 0.043, most of which is driven by the unestimated taps, whose contribution is given as equation (16).

Case 3: Up/Down Sampling with a Pulse-Shaping Filter:

When a pulse-shaping filter is used at the transmitter 22, the time-domain signal needs to be up-sampled at the transmitter 22 and down-sampled at the receiver 42. However, even with uniformly spaced pilots in the original OFDM symbol, the desired orthogonality properties of the $W_p$ matrix cannot be guaranteed. Denoting by F and $F_p$, the diagonal matrices constructed from the frequency response of the transmit pulse-shaping filter at all frequency bins and pilot frequency bins, respectively, and defining $$A = W_t (W_{pt}^H F_p^H F_p W_{pt})^{-1} W_{pt}^H F_p^H \qquad (17.)$$

The estimate of the channel frequency response is therefore $$\hat{H} = AX_p = AF_p W_{pt} h_t + AF_p W_{pr} h_r + An_p \qquad (18.)$$

where $X_p$ is the received vector at pilot positions after canceling the effect of receive filter. Using equation (1) and the fact that $AF_p W_{pt} = W_t$, the estimation error is given by the following:

$$\tilde{H} = (AF_p W_{pr} - W_r) h_r + An_p \qquad (19.)$$

From equation (19), the average estimation variance at each frequency bin will be given by $$\sigma_E^2 = \frac{1}{N} \text{trace} \qquad (20.)$$

$$\left\{ (AF_p W_{pr} - W_r) \begin{bmatrix} P_{N_t} & & 0 \\ & \ddots & \\ 0 & & P_{L-1} \end{bmatrix} (W_{pr}^H F_p^H A^H - W_r^H) + \sigma^2 AA^H \right\}$$

Similar to the first and second cases above, the estimation variance consists of contributions from the unestimated taps, as well as the additive noise.

Constellation Design Criterion:

One aspect of the present invention is to set forth a design criterion for constellations, especially partially coherent constellations for multi-carrier systems. Denoting by $S_i$, $X_i$, $\hat{H}_i$, and $\tilde{H}_i$, the transmitted signal, received signal, channel estimate, and the estimation error, respectively, at the $i^{th}$ frequency bin, the conditional probability distribution of the received signal is expressed as:

$$p(X_i | S_i, \hat{H}_i) = \qquad (21.)$$

$$E_{\tilde{H}_i} \{p(X_i | S_i, \hat{H}_i, \tilde{H}_i)\} = \frac{1}{\pi \sigma^2 (1 + \sigma_E^2 |S_i|^2)} \exp \left\{ -\frac{|X_i - S_i \hat{H}_i|^2}{\sigma^2 (1 + \sigma_E^2 |S_i|^2)} \right\}$$

The maximum likelihood (ML) detector will maximize the expression of equation (21) over all of the possible values for $S_i$ to find the transmitted symbol:

$$\hat{S}_i = \underset{S_i \in C}{\operatorname{argmax}} p(X_i | S_i, \hat{H}_i) \qquad (22.)$$

where C is the signal constellation.

The design criterion does not seek to maximize a minimum Euclidean distance between constellation points, but rather seeks to maximize a minimum distance between distributions of conditional probabilities. The preferred approach is to derive the design criteria using the Kullback-Leibler (KL) distance between the conditional distributions as the performance criterion. The expected KL distance between constellation points is given by the following expression:

$$D(c_i \| c_j) = \qquad (23.)$$

$$\frac{1 + \sigma_E^2 |c_i|^2}{1 + \sigma_E^2 |c_j|^2} - \ln\left(\frac{1 + \sigma_E^2 |c_i|^2}{1 + \sigma_E^2 |c_j|^2}\right) - 1 + \ln\left(1 + (1 - \sigma_E^2) \frac{|c_i - c_j|^2}{1 + \sigma_E^2 |c_j|^2}\right)$$

where $c_i$ and $c_j$ are two different constellation points. (Here, the constellation is scaled by the inverse of noise variance, so that the average energy of the constellation is equal to the signal to noise ratio SNR). The constellation design criterion is then given as $$\max_{\substack{C = \{c_1, \cdots, c_M\} \\ \frac{1}{M} \sum_{i=1}^{M} |c_i|^2 \leq P_{av}}} \min_{i \neq j} D(c_i \| c_j) \qquad (24.)$$

where M is the total number of constellation points ($\log_2 M$ is the spectral efficiency in b/s/Hz), and $P_{av}$ is the average power of the constellation or the SNR value in this case.

Even though this design criterion is for the instance where the estimation error is independent from the channel estimates (which is not true for the estimator used here), significant performance gains may still be achieved using this design criterion for the system under consideration. It is expected that even larger performance gains are achievable by using the information about the correlation between channel estimates and estimation error to derive a new design criterion or to improve upon the criteria described herein. Also, the correlation between the estimation errors on different frequency bins is neglected herein. This is because either independent decisions on the data on different frequency bins (i.e., OFDM system) will be made, or frequency interleaving will be used to sufficiently separate the chips involved in each symbol (in a multi-carrier (MC)-CDMA system) to make the correlation between the corresponding channel values (and hence the estimation errors) as small as possible.

Preferably, a multilevel circular structure is used for the constellations of the present invention. However, rotations of the constituent circular subsets of the constellations is allowed in order to obtain even better distance properties. The optimum values for the angular offsets between the adjacent subsets is based on the number of constellation points in those subsets (i.e., to maximize the minimum angular distance between the two subsets). For example, if two adjacent subsets have 3 and 4 points, respectively, the optimum relative angular offset between these two subsets is 15°.

Partially Coherent Constellations for the Multi-Carrier System:

The below description is for constellations designed for a multi-carrier system in the Vehicular A channel of FIG. 3A at a sampling rate of 4,915,200 samples per second (four times the chip rate of 1×EV-DV standard). We considered three cases corresponding to the three cases detailed above ($N_p \geq L$; $N_p > L$; and Up/Down Sampling).

For the first case, a multi-carrier system has sixteen pilots inserted in each OFDM symbol, and eight first taps of the Vehicular A channel are estimated. The estimation variances for this system at different SNR values are given in Table 1 below. It is noted that the optimum number of estimated taps in this case is not necessarily equal to eight at all SNR values. As above, at high SNR it is beneficial to estimate all of the taps of the channel. Eight taps is optimal for the medium values of SNR, and was selected to keep the number of the estimated taps constant for the whole range of SNR.

TABLE 1

Estimation variances and minimum distances when 16 pilots are estimating 8 taps of the Vehicular A channel.

| | SNR per Bit (dB) | | | | | |
|---|---|---|---|---|---|---|
| | 5 | 10 | 15 | 20 | 25 | 30 |
| Estimation Variance | 0.0597 | 0.0327 | 0.0241 | 0.0214 | 0.0206 | 0.0203 |
| $d_{min}$, 16QAM | 1.1438 | 1.7872 | 2.2487 | 2.4783 | 2.5648 | 2.5964 |
| $d_{min}$, New Constellation | 1.4422 | 2.2543 | 2.9111 | 3.4601 | 3.8595 | 4.0714 |

Next, partially coherent constellations were designed based on the values in Table 1 for the estimation error and SNR. The resulting constellations are shown in FIGS. 6A–6F, and show that as SNR increases, the outer levels become farther apart. This is because the degrading effect of the estimation variance becomes more significant at high SNR values, and for a fixed value of estimation variance, a constellation designed for a higher SNR is closer to a non-coherent constellation than one designed for a lower SNR. For comparison, the minimum KL distances between the constellation points for the conventional 16QAM constellation and the new constellations are also shown in Table 1 above.

Using FIG. 6A as an example for the terminology used herein, each circle on the constellation diagram 52 represents a constellation point. An origin point 54 is located at the origin of the diagram (x=0, y=0). As is evident from other constellations (FIGS. 6C, 6D), not every signal constellation according to the present invention defines an origin point 54. Except for the origin point (where present), each and every other constellation point lies within one subset of points that together define a circle centered on the origin. A first subset of points 56 is arranged, for example, nearest the origin. A second subset of points 58, adjacent to the first subset 56, is rotated to maximize a minimum angular distance between the two nearest points of the adjacent subsets 56, 58. Stated another way, assume a first line 60 (not part of the constellation) defined by the origin and a first point 62 of the first subset 56. Assume also a second line 64 (not part of the constellation) defined by the origin and a second point 66 of the second subset 58, wherein the first point 62 and the second point 66 are adjacent to one another. An angle 68 between the first line 60 and the second line 64 achieves a largest or maximized minimum angular distance between a target point of the first subset 56 (which may or may not be the first point 62) and the point of the second subset 58 (which may or may not be the second point 66) that is nearest to the target point. When the subsets 56, 58 are properly rotated relative to one another, changes to the angle 68 (i.e., further rotation of the second subset 58 relative to the first subset 56) will cause a reduction in the angular distance between some point of the first subset 56 and some point of the second subset 58, so that they are closer than the maximized minimum angular distance. Rotation of the subsets relative to one another is determined by maximizing a minimum angular distance between points of adjacent subsets. Separation of subsets from one another (e.g., diameter of each subset) is determined by maximizing a minimum conditional probability distribution distance (e.g., KL distance) between points of adjacent subsets (and between all constellation points).

Figure 7:
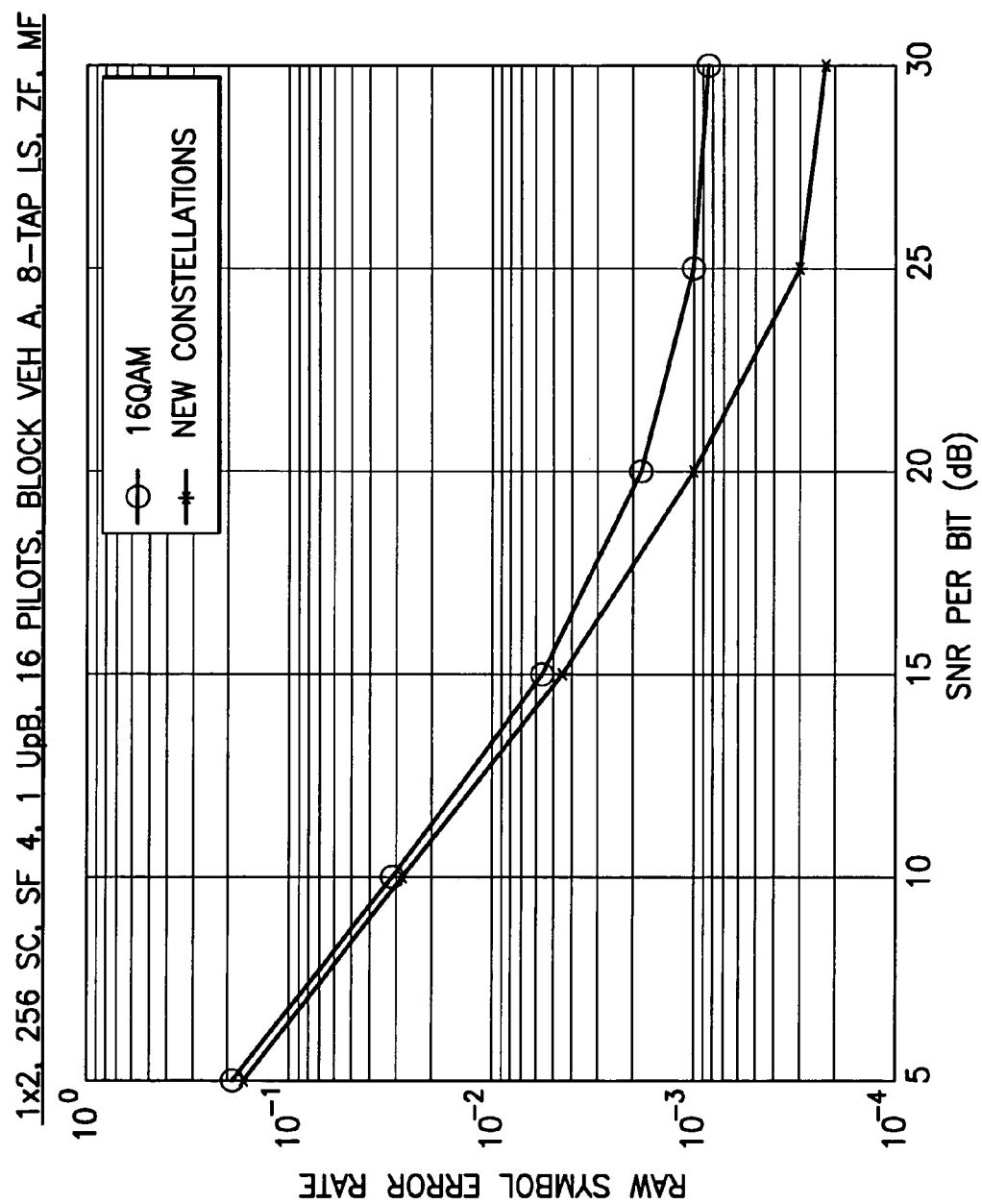
FIG. 7 is a graph showing error rates for the constellations of FIGS. 6A–6F (each a separate SNR per bit) as compared to error rates for a conventional 16 QAM constellation.

The constellations of FIGS. 6A–6F were used in a MC-CDMA system with 256 sub-carriers and spreading factor of 4. One transmit antenna and two receive antennas were used, and the channel was a block fading channel with the same delay profile as of ITU Vehicular A. The sampling rate is assumed to be 4,915,200 samples per second, and no up-sampling is used. The receiver is a Zero-Forcing channel cancellation followed by a Matched Filter. The results of the simulation for raw symbol error rate of this system and the one with the conventional 16QAM constellation are shown in FIG. 7. The constellations of FIG. 6 as graphed in FIG. 7 exhibit an error floor due to multipath that is reduced by more than 75%, and substantial performance gains are achieved especially at large SNR values, as compared to conventional 16QAM constellations.

As noted above, in high mobility environments, one would need to use shorter OFDM symbols to reduce the degrading effect of the Doppler spread. In order to keep the pilot overhead constant, one should use smaller number of pilots for shorter OFDM symbols. The second case above, wherein the number of taps exceeds the number of pilots, was simulated using a multi-carrier system with 128 sub-carriers, and eight pilots in each OFDM symbol, when seven first taps of the Vehicular A channel are estimated. The estimation variances at different SNR values are given in Table 2 below. The optimum number of the estimated taps in this case is in fact seven for the whole considered range of SNR. The SNR values in Table 2 are SNR per bit, whereas the SNR values of FIGS. 5A–5B are SNR per symbol.

TABLE 2

Estimation variances and minimum distances when 8 pilots are estimating 7 taps of the Vehicular A channel.

| | SNR per Bit (dB) | | | | | |
|---|---|---|---|---|---|---|
| | 5 | 10 | 15 | 20 | 25 | 30 |
| Estimation Variance | 0.1095 | 0.0622 | 0.0473 | 0.0473 | 0.0411 | 0.0406 |
| $d_{min}$, 16QAM | 0.8928 | 1.4070 | 1.7437 | 1.8966 | 1.9528 | 1.9720 |
| $d_{min}$, New Constellation | 1.2548 | 1.9381 | 2.5434 | 3.0384 | 3.3097 | 3.5006 |

The partially coherent constellations designed based on the values of Table 2 for estimation variance are shown in FIGS. 8A–8F. Similar to FIGS. 6A–6F, at high SNR values the outer levels of the constellation become farther apart, for the same reason mentioned above. For comparison, the minimum KL distances between the constellation points for the conventional 16QAM constellation and the new constellations are also shown in Table 2.

Figure 9:
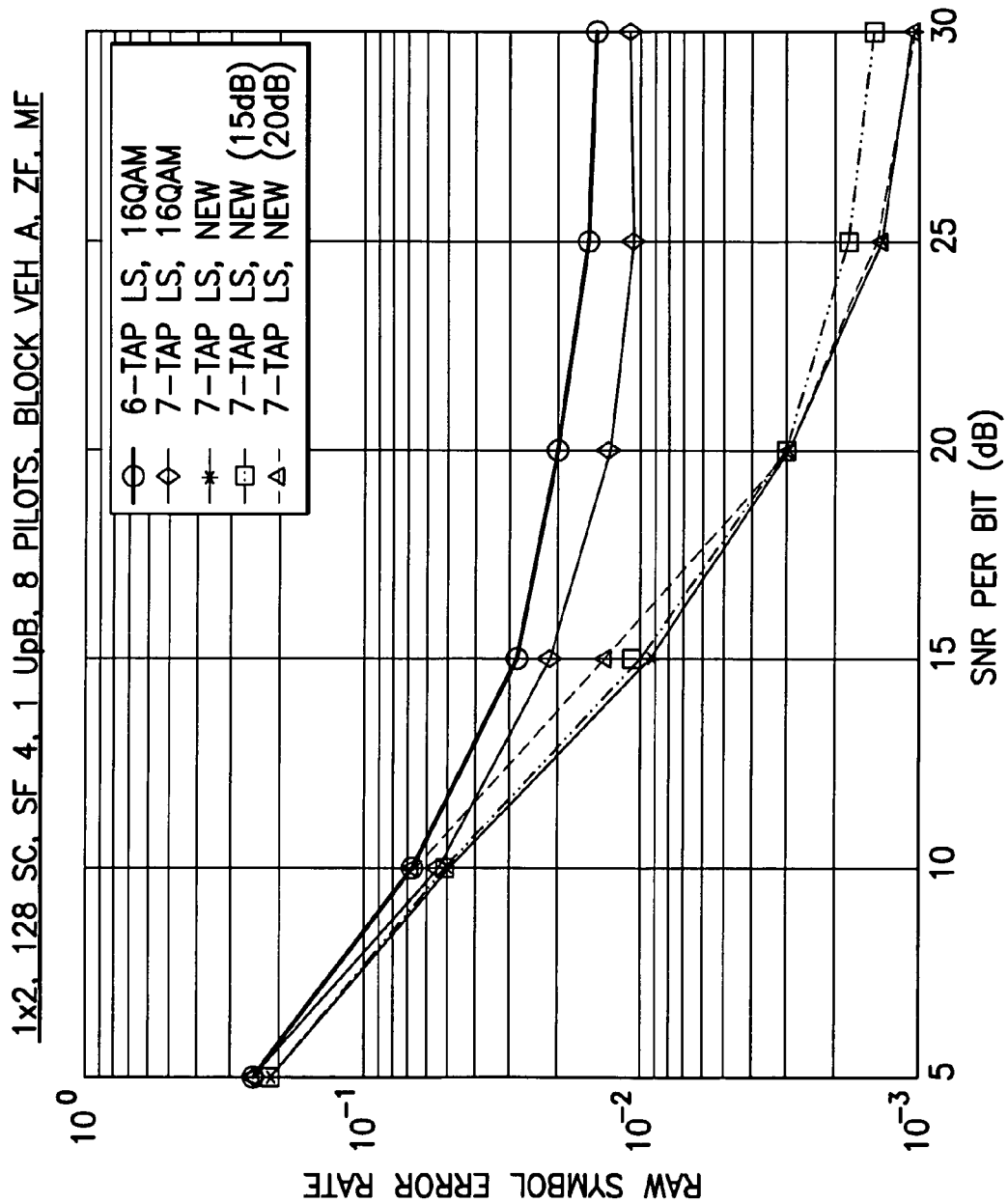
FIG. 9 is a graph showing error rates for the constellations of FIGS. 8A–8F (each a separate SNR per bit) as compared to error rates for a conventional 16 QAM constellation, and additionally plotting a 16 QAM constellation with a six-tap channel estimator and the constellations of FIGS. 8C and 8D plotted over all SNR values, wherein all receivers use a least squares channel estimator as noted in the legend.

The results of simulation of the constellations of FIGS. 8A–8F in a MC-CDMA system with 128 sub-carriers and eight pilots in each OFDM symbol estimating seven taps of the Vehicular A channel are shown in FIG. 9, where the performance of the new constellation of FIGS. 8A–8F is compared to the system using the conventional 16QAM constellation. Other parameters of this system are the same as the ones for FIG. 7. In order to demonstrate the effect of number of estimated taps in the performance, FIG. 9 also includes the curve for a system with 16QAM constellation and six estimated taps.

By estimating the right number of channel taps (as suggested by minimizing the expression in equation (15) over $N_t$), and using the partially coherent constellations designed for the corresponding estimation variances, the error floor is reduced by more than one order of magnitude as compared to a conventional QAM constellation.

Since using different constellations at different values of SNR might not be very practical, FIG. 9 also includes the symbol error rate curves obtained by choosing the constellations designed for 15 dB and 20 dB, and using them in the whole range of SNR. As expected, the new constellation designed for 15 dB (labeled as "New (15 dB)"), has a performance very close to the optimal curve at low SNR values, but diverges from that curve at high SNR, whereas the constellation designed for 20 dB (labeled as "New (20 dB)"), shows close to optimal performance at high SNR and a slightly degraded performance at low SNR. Therefore, depending on the practical range of SNR for the real system, one can choose a single constellation that gives close to optimal performance in that range.

Figure 10:
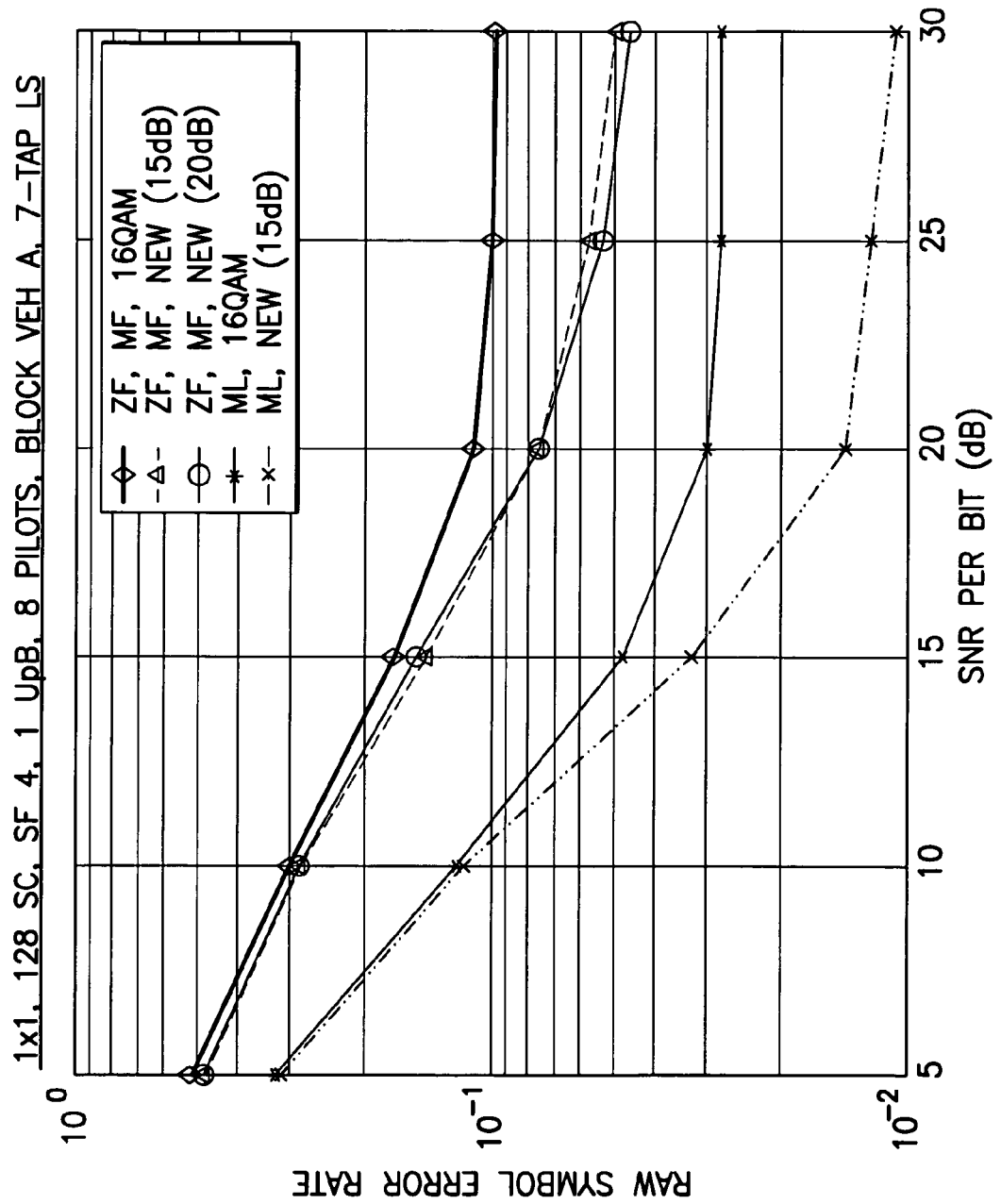
FIG. 10 is a graph similar to FIG. 9 but wherein the receiver has one antenna, all estimators use seven taps, and the various curves represent different detectors (MF or Maximum Likelihood ML) as noted in the legend.
Figures 11A, 11B, 11C, 11D, 11E, 11F:
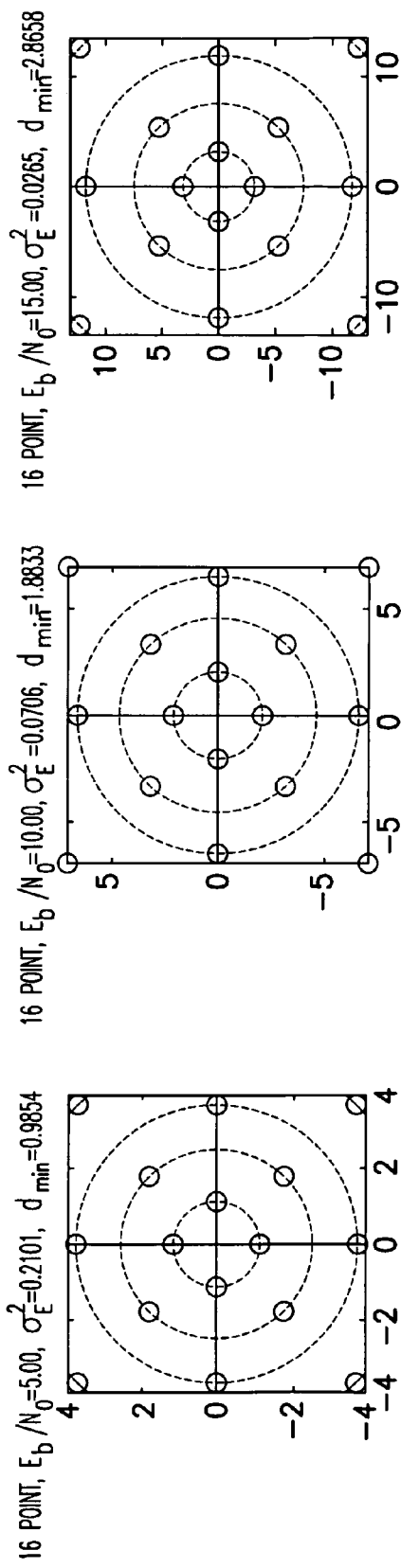
FIGS. 11A–11F are constellation diagrams, each labeled with a different SNR to correspond to a column of Table 3, for a system with up/down sampling, 128 sub-carriers, eight pilots, and estimating seven taps of the Vehicular A channel.

Similar performance gains can be achieved if a different number of receive antennas, or a different kind of detector (e.g. maximum likelihood ML) is used. FIG. 10 shows an example with one receive antenna, and receivers with matched filter (MF) and ML detectors. However, increasing the number of receive antennas always increases the gap between the performances of the conventional and new constellations. The reason is that the KL distance between constellation points increases linearly with the number of receive antennas, and thus, the difference between the minimum distances of the conventional and new constellations also increases as the number of receive antennas increase.

For the third case above wherein a pulse shaping filter is used, the simulation included up-sampling at a rate of 4 samples per chip at the transmitter 22 and down-sampling at the receiver 42. Other parameters of the system are the same as the previous example above. The estimation variances at different SNR values for this system, obtained from Equation (20), are shown in Table 3 below.

TABLE 3

Estimation variances and minimum distances for a multi-carrier system with up/down sampling, 128 sub-carriers, 8 pilots, and estimating 7 taps of the Vehicular A channel.

| | SNR per Bit (dB) | | | | | |
|---|---|---|---|---|---|---|
| | 5 | 10 | 15 | 20 | 25 | 30 |
| Estimation Variance | 0.2101 | 0.0706 | 0.0265 | 0.0125 | 0.0081 | 0.0067 |
| $d_{min}$, 16QAM | 0.6160 | 1.3296 | 2.1786 | 2.9322 | 3.4148 | 3.6411 |
| $d_{min}$, New Constellation | 0.9854 | 1.8833 | 2.8658 | 3.7796 | 4.4876 | 4.9441 |

The partially coherent constellations designed for the above values in Table 3 of the estimation variance are shown in FIGS. 11A–11F. For comparison, the minimum KL distances between the constellation points for the conventional 16QAM constellation and the new constellations are also shown in Table 3.

Figure 12A:
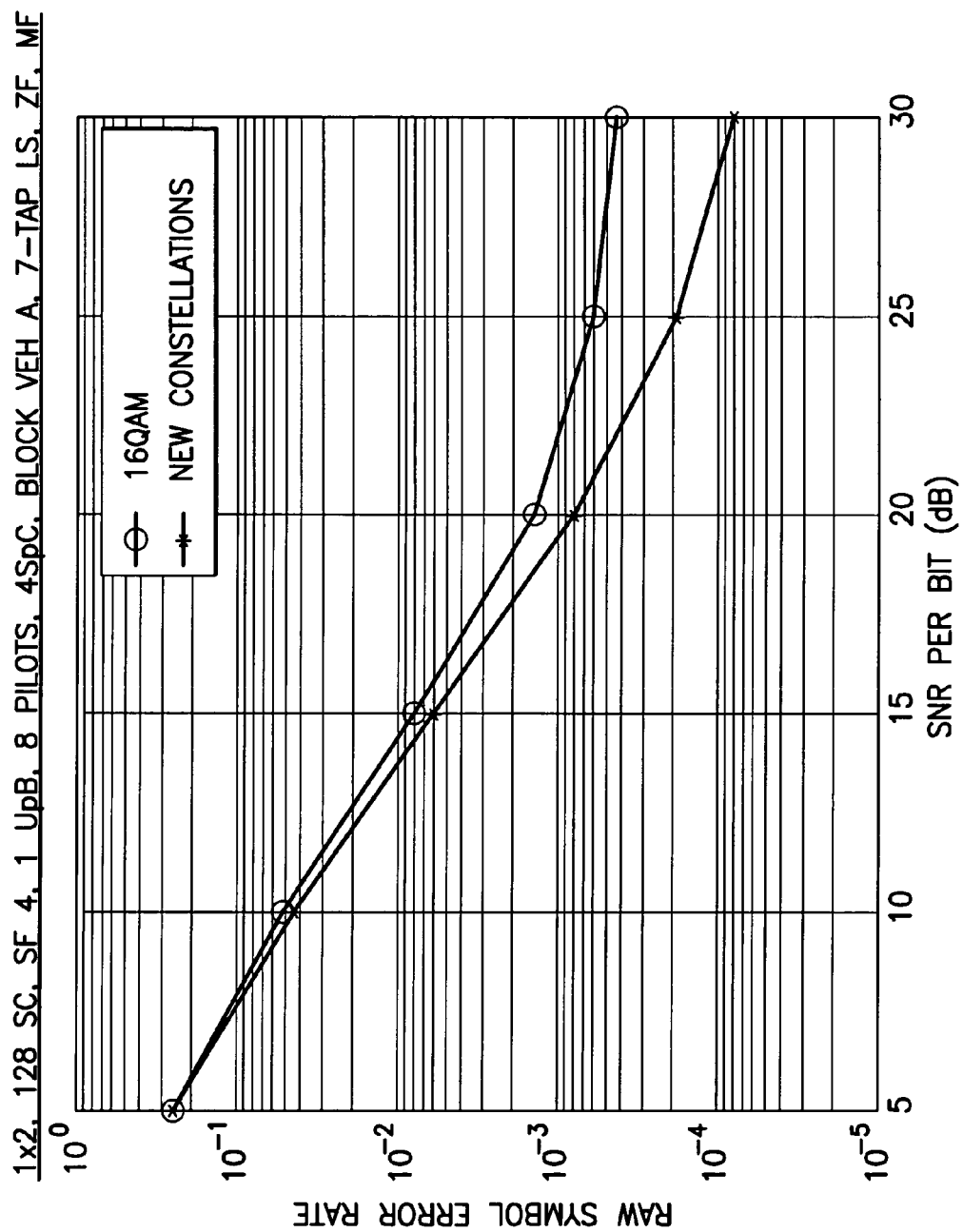
FIG. 12A is a graph showing raw symbol error rates for each of the constellations in FIGS. 11A–11F as compared to a 16 QAM constellation for the Block Vehicular A channel.
Figure 12B:
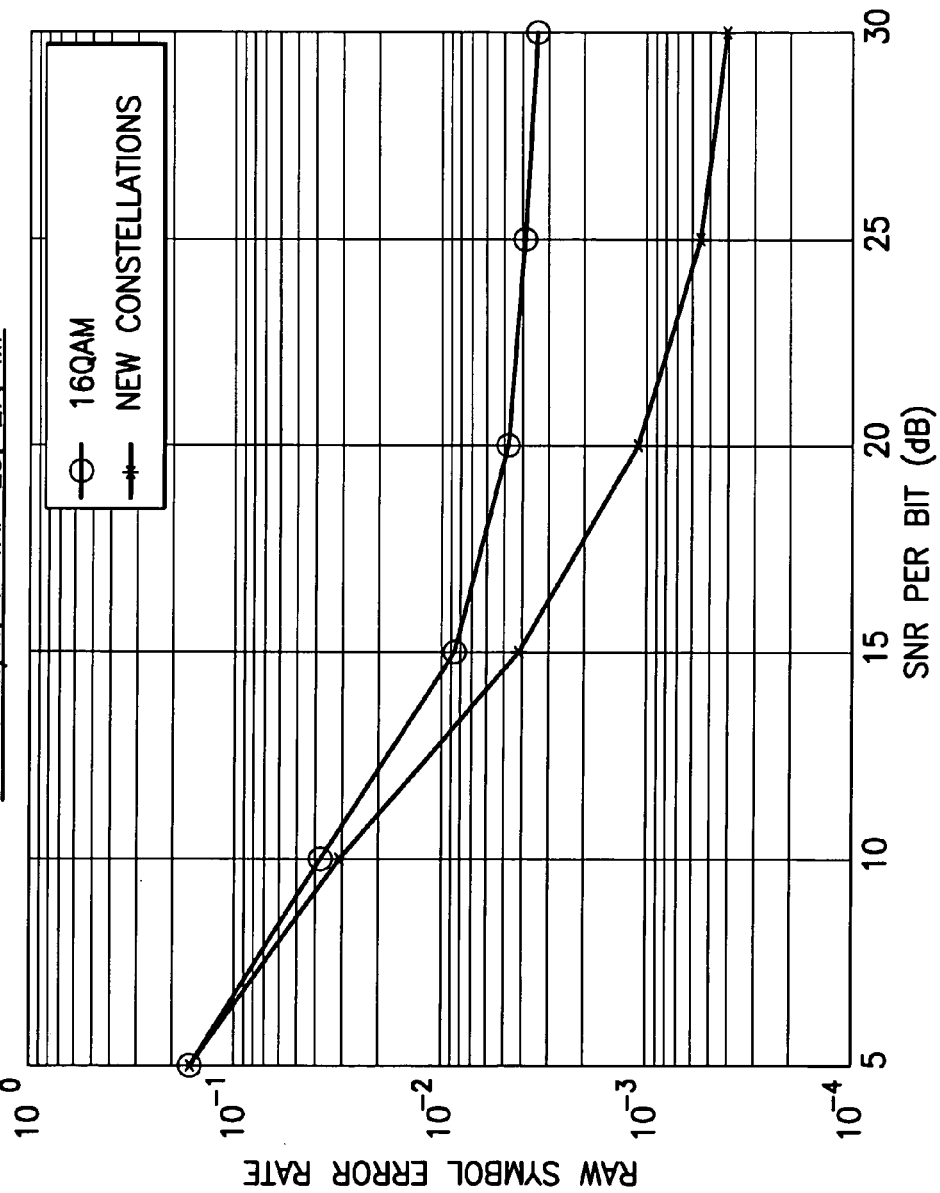
FIG. 12B is a graph similar to FIG. 12A but for the actual Vehicular A channel at 120 Km/hr.
Figure 14:
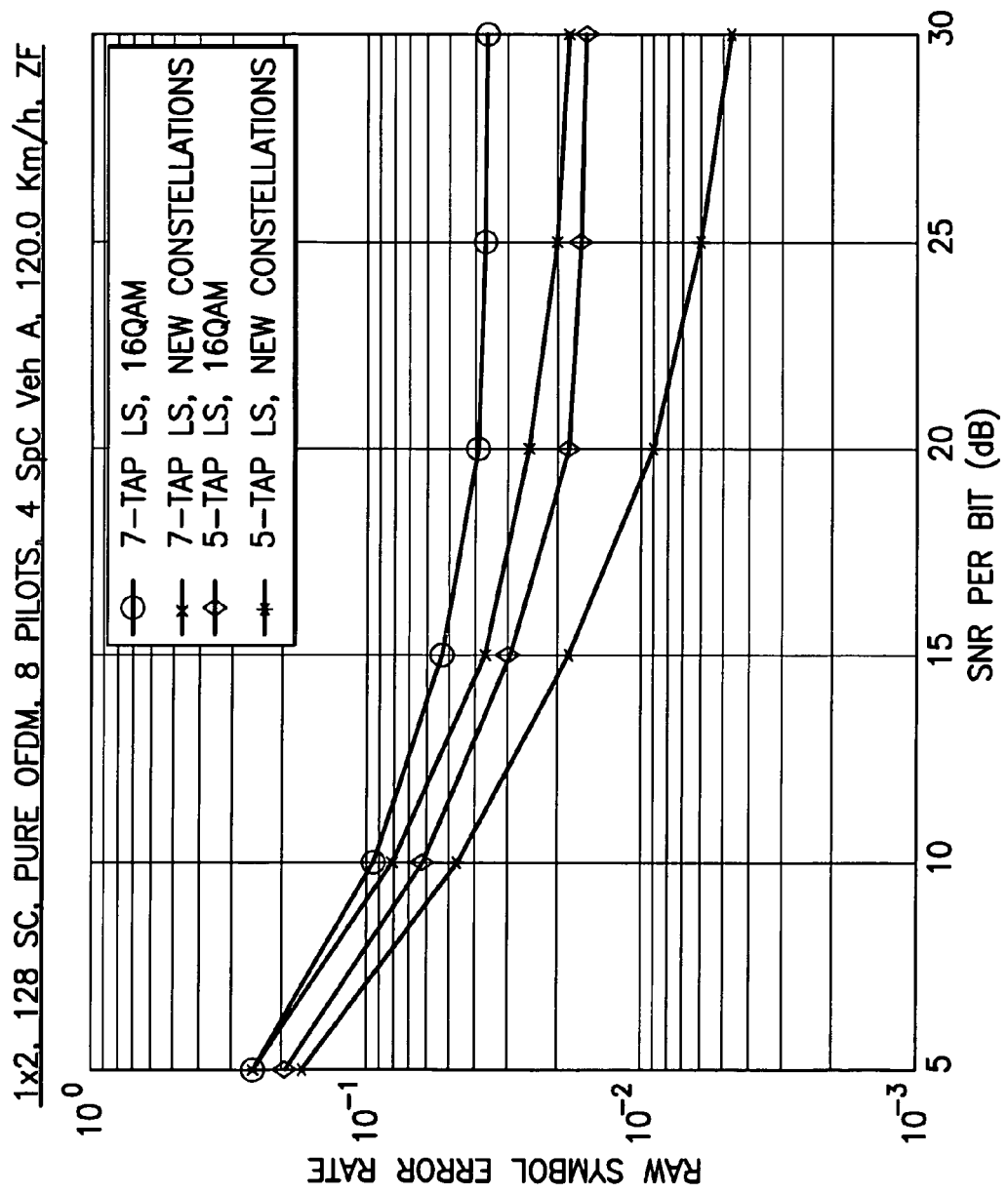
FIG. 14 is a graph showing raw symbol error rates for each of a 16 QAM constellation plotted with each of a five-tap and a seven-tap channel estimator, and a new constellation plotted with each of a five-tap and a seven-tap channel estimator, all for an OFDM system with up/down sampling, 128 sub-carriers, and eight pilots in the Vehicular A channel at 120 Km/hr.

The graphs of FIGS. 12A–12B compares the performance of the above constellations with the conventional 16QAM constellation in block Vehicular A channel (FIG. 12A), and in the actual Vehicular A channel at 120 Km/h (FIG. 12B). In both instances, significant performance improvements are achieved by using the new constellations as compared to conventional QAM constellations. Also, due to the Doppler spread, the error floors in the actual channel of FIG. 14B are higher than in the block channel of FIG. 12A (note the vertical scale).

Figure 13:
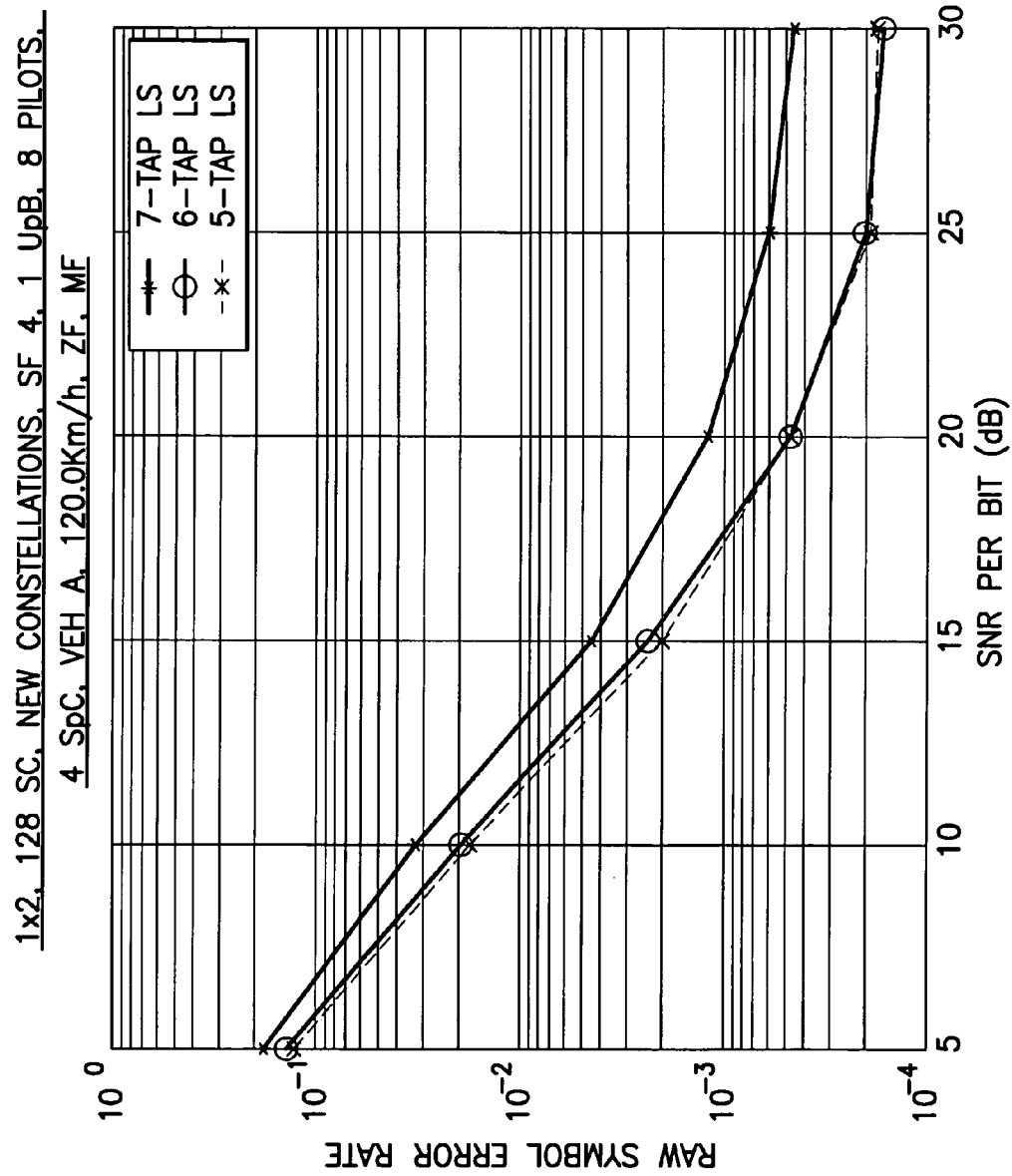
FIG. 13 is a graph similar to FIG. 12B but showing comparative performance of a 5-tap, a 6-tap, and a 7-tap estimators for the new constellation.

Furthermore, FIG. 13 shows that estimating a slightly smaller number of channel taps results in a better performance in the actual Vehicular A channel at 120 Km/h, which is not the case in the block channel. FIG. 13 reflects only the new constellations.

The observed performance gains detailed above are not limited to the MC-CDMA systems. Similar gains can be achieved in a pure OFDM system as well. FIG. 13 shows the performance comparison between a conventional 16QAM constellation and the new constellations in an OFDM system, with 7-tap and 5-tap estimators. Other parameters of the system are similar to those in the previous example. For both 7-tap and 5-tap estimators, the new constellations achieve substantial performance gains over the 16QAM modulation. Similar to the data of FIG. 13, using a 5-tap estimator results in a better performance as compared to a 7-tap estimator in the actual Vehicular A channel, which is not the case for the block channel.

In summary, estimation variance was used to isolate a design criterion for partially coherent signal constellations for a multi-carrier system with pilot based estimation. These new constellations are demonstrated to achieve significant performance improvements over the conventional QAM constellations, in both MC-CDMA and OFDM systems. The performance improvement is even more pronounced in fast fading channels with large delay spreads, when the number of measurements per channel realization is less than the number of channel parameters. Using these new constellations in a multi-carrier system can reduce error floors due to the multipath by as much as one order of magnitude.

The present invention is particularly valuable in wireless communication systems used worldwide with mobile terminals such as cellular phones. It is also advantageous for wireline systems, short-range wireless systems (e.g., Bluetooth), and optical networks using line-of-sight or waveguide transmission mediums, or any other application using a multi-carrier system over any of the various appropriate transmission mediums.

While there has been illustrated and described what is at present considered to be a preferred embodiment of the claimed invention, it will be appreciated that numerous changes and modifications are likely to occur to those skilled in the art. For example, OFDM and MC-CDMA have been used as examples of a multi-carrier modulation scheme or multi-carrier system, but constellations of the present invention are equally valid with any multi-carrier system. It is intended in the appended claims to cover all those changes and modifications that fall within the spirit and scope of the claimed invention.

What is claimed is:

1. A communication unit comprising:
   a storage medium for storing a signal constellation, the signal constellation comprising:
   a plurality of constellation points wherein two constellation points defining a minimum separation from one another are separated by a distance D based on a maximized minimum difference between conditional probability distributions; and at least one of a transmitter or a receiver, wherein the transmitter comprises a mapper for converting an input signal to a plurality of data symbols that each correspond to at least one of the constellation points, a pilot circuit for adding pilot symbols to the data symbols, and a modulator for modulating the data symbols in accordance with a multi-carrier transmission technique, and wherein the receiver comprises a channel estimator for estimating a channel of a multi-carrier system using pilot symbols of a received set of symbols, a demodulator for demodulating at least a portion of the received set of symbols in accordance with a multi-carrier transmission technique, and a de-mapper for converting the demodulated symbols to a plurality of data signals that each alone or in combination correspond to a constellation point;

wherein the distance D is the maximized minimum difference, given by:

$$\max_{\substack{C=\{c_1,\cdots,c_M\} \\ \frac{1}{M}\sum_{i=1}^{M} |c_i|^2 \leq P_{av}}} \min_{i \neq j} D(c_i \| c_j),$$

wherein i and j are integer indexes, C is the signal constellation, $c_i$ and $c_j$ are constellation points, M is the total number of constellation points in the constellation, and $P_{av}$ is one of a constellation power, a ratio of signal power to noise power, a ratio of bit energy to noise power spectral density, or a ratio of symbol energy to noise power spectral density.

2. The communication unit of claim 1 wherein the multi-carrier transmission technique is one of orthogonal frequency division multiplexing (OFDM) or multi-carrier code division multiple access (MC-CDMA).

3. The communication unit of claim 1 wherein each of the plurality of constellation points lies within one of at least two subsets of points, and wherein each of the at least two subsets of points form a concentric circle when plotted on a diagram.

4. The communication unit of claim 3 wherein the at least two subsets of points are adjacent to one another, and wherein one of the at least two subsets of points is rotated relative to the other of the at least two subsets of points such that a first line defined by an origin of the diagram and a point of one of the at least two subsets does not also pass through a point of the other of the at least two subsets.

5. The communication unit of claim 4 wherein an angle between the first line and a second line defined by the origin and a point on the other of the at least two subsets defines an angle that yields a maximized minimum angular distance between a point on one of the at least two subsets and a nearest point on the other of the at least two subsets.

6. The communication unit of claim 1 wherein each of the plurality of constellation points, except an origin point, lies within one of at least two subsets of points, and wherein each of the at least two subsets of points form a concentric circle when plotted on a diagram, and wherein the origin point lies at the center of the concentric circles.

7. The communication unit of claim 6 wherein the at least two subsets of points are adjacent to one another, and wherein one of the at least two subsets of points is rotated relative to the other of the at least two subsets of points such that a first line defined by the origin point and a point of one of the at least two subsets does not also pass through a point of the other of the at least two subsets.

8. The communication unit of claim 7 wherein an angle between the first line and a second line defined by the origin point and a point on the other of the at least two subsets defines an angle that yields a maximized minimum angular distance between a point on one of the at least two subsets and a nearest point on the other of the at least two subsets.

9. The communication unit of claim 1 wherein the pilot symbols are spaced equally in the frequency domain.

10. The communication unit of claim 1 wherein the receiver uses $N_p$ pilot symbols within a coherence interval to estimate $N_t$ taps of a multipath channel with a total of L taps, wherein the number $N_t$ is selected to minimize an estimation variance at a frequency bin defined by the multi-carrier modulating scheme.

11. The communication unit of claim 10 wherein $N_p < L$.

12. A communication unit for communicating over a wireless multi-carrier system comprising:

a storage medium for storing a first signal constellation and a second signal constellation, wherein the first signal constellation comprises a plurality of first constellation points of which two nearest first constellation points define a minimum separation distance D from one another that is based on a maximized minimum difference between conditional probability distributions, and wherein the first signal constellation is used for communicating over a wireless multi-carrier system when one of a ratio of signal power to noise power, a ratio of bit energy to noise power spectral density, or a ratio of symbol energy to noise power spectral density exceeds a threshold value;

wherein the second signal constellation comprises a plurality of second constellation points of which two nearest second constellation points define a minimum separation distance D from one another that is based on a maximized minimum difference between conditional probability distributions, and wherein the second signal constellation is used for communicating over a wireless multi-carrier system when one of a ratio of signal power to noise power, a ratio of bit energy to noise power spectral density, or a ratio of symbol energy to noise power spectral density is below the threshold value; and at least one of a modulator for modulating a signal to be transmitted in accordance with a multi-carrier modulation technique and a mapper for mapping a signal to be transmitted to one of the first or second signal constellations, or a demodulator for demodulating a received signal in accordance with a multi-carrier modulation technique and a de-mapper for mapping a received signal from one of the first or second signal constellations;

wherein for each of the first and second signal constellation, the distance D is the maximized minimum difference, given by:

$$\max_{\substack{C=\{c_1,\cdots,c_M\} \\ \frac{1}{M}\sum_{i=1}^{M} |c_i|^2 \leq P_{av}}} \min_{i \neq j} D(c_i \| c_j),$$

wherein i and j are integer indexes, C is the signal constellation, $c_i$ and $c_j$ are constellation points, M is the total number of constellation points in the constellation, and $P_{av}$ is one of a constellation power, the ratio of signal power to noise power, the ratio of bit energy to noise power spectral density, or the ratio of symbol energy to noise power spectral density.

13. A mobile terminal for communicating over a fast fading, multi-carrier wireless channel, comprising:
a demodulator for demodulating a signal received from a multi-carrier wireless channel;
a channel estimator for estimating the multi-carrier wireless channel using at least some pilot signals of the signal received;
a signal constellation embodied on a computer storage medium, the signal
constellation comprising a plurality of points exhibiting a minimum separation D
given by:

$$\max_{C=\{c_1,\ldots,c_M\}} \min_{(i \neq j)} D(c_i \| c_j),$$

$$\frac{1}{M}\sum_{i=1}^{M} |c_i|^2 \leq P_{av}$$

wherein i and j are integer indexes, C is the signal constellation, $c_i$ and $c_j$ are constellation points, M is the total number of constellation points in the constellation, and $P_{av}$ is one of a constellation power, a ratio of signal power to noise power, a ratio of bit energy to noise power spectral density, or a ratio of symbol energy to noise power spectral density; and
computer code embodied on a computer storage medium for matching a symbol of the signal received to the signal constellation.

14. The mobile terminal of claim 13 further comprising:
a modulator for modulating a signal to be transmitted over the multi-carrier wireless channel;
a pilot insertion block for adding pilots to the signal to be transmitted; and
a second computer code embodied on a computer storage medium for matching the signal to be transmitted to the signal constellation.

15. The mobile terminal of claim 13 wherein the multi-carrier wireless channel is defined by one of orthogonal frequency division multiplexing (OFDM) or multi-carrier code division multiple access (MC-CDMA).

16. A method of transmitting a signal over a multi-carrier system comprising:
mapping a signal to be transmitted to a signal constellation, the signal constellation defining a plurality of constellation points, wherein a minimum separation distance D between two constellation points is based on a maximized minimum difference between conditional probability distributions;
adding pilot symbols to the signal to be transmitted for aiding in channel estimation; and
modulating the signal to be transmitted in accordance with a multi-carrier modulation technique
wherein the distance D is the maximized minimum difference, given by:

$$\max_{C=\{c_1,\ldots,c_M\}} \min_{(i \neq j)} D(c_i \| c_j),$$

$$\frac{1}{M}\sum_{i=1}^{M} |c_i|^2 \leq P_{av}$$

wherein i and j are integer indexes, C is the signal constellation, $c_i$ and $c_j$ are constellation points, M is the total number of constellation points in the constellation, and $P_{av}$ is one of a constellation power, a ratio of signal power to noise power, a ratio of bit energy to noise power spectral density, or a ratio of symbol energy to noise power spectral density.

* * * * *